United States Patent
Kang

(10) Patent No.: US 8,954,757 B2
(45) Date of Patent: Feb. 10, 2015

(54) METHOD, HOST, STORAGE, AND MACHINE-READABLE STORAGE MEDIUM FOR PROTECTING CONTENT

(75) Inventor: Bo-Gyeong Kang, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 133 days.

(21) Appl. No.: 13/439,378

(22) Filed: Apr. 4, 2012

(65) Prior Publication Data

US 2012/0254630 A1 Oct. 4, 2012

(30) Foreign Application Priority Data

Apr. 4, 2011 (KR) .................. 10-2011-0030474
Jan. 6, 2012 (KR) .................. 10-2012-0002122

(51) Int. Cl.
*G06F 11/30* (2006.01)
*G06F 21/78* (2013.01)
*G06F 21/10* (2013.01)
*G06F 21/45* (2013.01)
*G06F 21/73* (2013.01)
*H04L 29/06* (2006.01)

(52) U.S. Cl.
CPC .............. *G06F 21/78* (2013.01); *G06F 21/10* (2013.01); *G06F 21/45* (2013.01); *G06F 21/73* (2013.01); *H04L 63/061* (2013.01); *H04L 63/0876* (2013.01); *H04L 63/0428* (2013.01); *H04L 63/10* (2013.01); *G06F 2221/2129* (2013.01); *G06F 2221/2107* (2013.01)
USPC .......................................... 713/193

(58) Field of Classification Search
USPC ...................... 713/189, 193; 726/2
See application file for complete search history.

(56) References Cited

U.S. PATENT DOCUMENTS

| 8,027,921 | B1 * | 9/2011 | Boydstun et al. ............... 705/50 |
| 2004/0039930 | A1 | 2/2004 | Ohmori et al. |
| 2007/0192610 | A1 * | 8/2007 | Chun et al. .................... 713/176 |
| 2008/0244734 | A1 | 10/2008 | Okaue |
| 2009/0313470 | A1 * | 12/2009 | Bade et al. .................... 713/169 |
| 2010/0222135 | A1 * | 9/2010 | Sylla et al. .................... 463/25 |

FOREIGN PATENT DOCUMENTS

| EP | 1 333 353 | 8/2003 |
| KR | 1020040008088 | 1/2004 |
| KR | 1020050114293 | 12/2005 |

* cited by examiner

*Primary Examiner* — Anthony Brown
(74) *Attorney, Agent, or Firm* — The Farrell Law Firm, P.C.

(57) ABSTRACT

Methods and apparatus are provided for protecting content of a storage. First authentication information regarding a first module is acquired. The first module is one of a plurality of modules included in the storage. The first module is authenticated based on first Unique Individual Information (UII) of the first module and the first authentication information. Second authentication information regarding a second module is acquired. The second module is another of the plurality of modules included in the storage. The second module is authenticated based on second UII of the second module and the second authentication information. Access to content stored in the storage is permitted when at least the first module and the second module are successfully authenticated.

15 Claims, 23 Drawing Sheets

METHOD, HOST, STORAGE, AND MACHINE-READABLE STORAGE MEDIUM FOR PROTECTING CONTENT

PRIORITY

This application claims priority under 35 U.S.C. §119(a) to a Korean Patent Application filed in the Korean Intellectual Property Office on Apr. 4, 2011 and assigned Serial No. 10-2011-0030474, and a Korean Patent Application filed in the Korean Intellectual Property Office on Jan. 6, 2012 and assigned Serial No. 10-2012-0002122, the entire disclosures of which are incorporated herein by reference.

BACKGROUND OF THE INVENTION

1. Field of the Invention

The present invention relates generally to a method and apparatus for protecting content, and more particularly, to a method and apparatus for protecting content stored in a storage device including a plurality of modules.

2. Description of the Related Art

As the demand for technologies, such as Digital Rights Management (DRM), copy protection, and the like, to protect content increases, the demand for techniques to authenticate storage devices for storing such content increases. These storage devices include, for example, Non-Volatile Memory (NVM) devices including a Solid State Disk (SSD), a flash memory card, etc. In addition to a scheme for encrypting the content, a scheme for verifying Hardware (H/W) suitability of storage devices is also required.

Although DRM technology, Content Protection for Recordable Media (CPRM) technology for Secure Digital (SD) cards, and Advanced Access Content System (AACS) technology for Blue-ray disks provide device authentication methods using a Public Key Infrastructure (PKI) or other cryptographic technologies, they may not provide a solution to the copying of a storage device itself.

The DRM technology and the CPRM and AACS standards provide methods for authenticating stored content and devices bound or coupled to the content by using a unique media ID and its corresponding encryption technique (e.g., PKI authentication). In addition, by matching a unique ID to content or an encryption key used to encrypt the content, access to a storage region of a storage device, i.e., improper operations (read, write, etc.) for illegal copying of data, is prevented.

Since conventional technologies match a unique media ID to a storage device regardless of a structure of the storage device, illegal authentication may occur if some of the chips of the storage device (a controller and a memory, such as a Programmable Random Access Memory (PRAM), a Dynamic Random Access Memory (DRAM), a flash, a Hard Disk Drive (HDD), etc.) are improperly used (or replaced).

SUMMARY OF THE INVENTION

The present invention has been made to address at least the above problems and/or disadvantages and to provide at least the advantages described below. Accordingly, an aspect of the present invention provides a method and apparatus for defense against a security attack, which occurs due to an improper operation of any module in a storage.

According to an aspect of the present invention, a method is provided for protecting content of a storage. First authentication information regarding a first module is acquired. The first module is one of a plurality of modules included in the storage. The first module is authenticated based on first Unique Individual Information (UII) of the first module and the first authentication information. Second authentication information regarding a second module is acquired. The second module is another of the plurality of modules included in the storage. The second module is authenticated based on second UII of the second module and the second authentication information. Access to content stored in the storage is permitted when at least the first module and the second module are successfully authenticated.

According to another aspect of the present invention, a machine-readable storage medium is provided having recorded thereon a program for executing a method for protecting content of a storage device. The method comprising the steps of: acquiring first authentication information regarding a first module, wherein the first module is one of a plurality of modules included in the storage device; authenticating the first module based on first Unique Individual Information (UII) of the first module and the first authentication information; acquiring second authentication information regarding a second module, wherein the second module is another of the plurality of modules included in the storage device; authenticating the second module based on second UII of the second module and the second authentication information; and permitting access to content stored in the storage device, when at least the first module and the second module are successfully authenticated.

According to another aspect of the present invention, a host is provided for protecting content of a storage. The host includes a first module authenticator for acquiring first authentication information regarding a first module and authenticating the first module based on first Unique Individual Information (UII) of the first module and the first authentication information. The first module is one of a plurality of modules included in the storage device. The host also includes a second module authenticator for acquiring second authentication information regarding a second module and authenticating the second module based on second UII of the second module and the second authentication information. The second module is another of the plurality of modules included in the storage device. The host further includes a memory for storing a preset authentication policy, and an authentication coordinator for controlling the first module authenticator and the second module authenticator according to the authentication policy, and permitting access to content stored in the storage when at least the first module and the second module are successfully authenticated.

According to another aspect of the present invention, a storage is provided for protecting content. The storage includes a first module having first Unique Individual Information (UII) and first authentication information. The first module provides the first UII and the first authentication information at the request of a host. The storage also includes a second module having second UII and second authentication information. The second module provides the second UII and the second authentication information at the request of the host and stores encrypted content. The encrypted content has been encrypted by using a content encryption key associated with the first UII, the second UII, the first authentication information, and the second authentication information.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
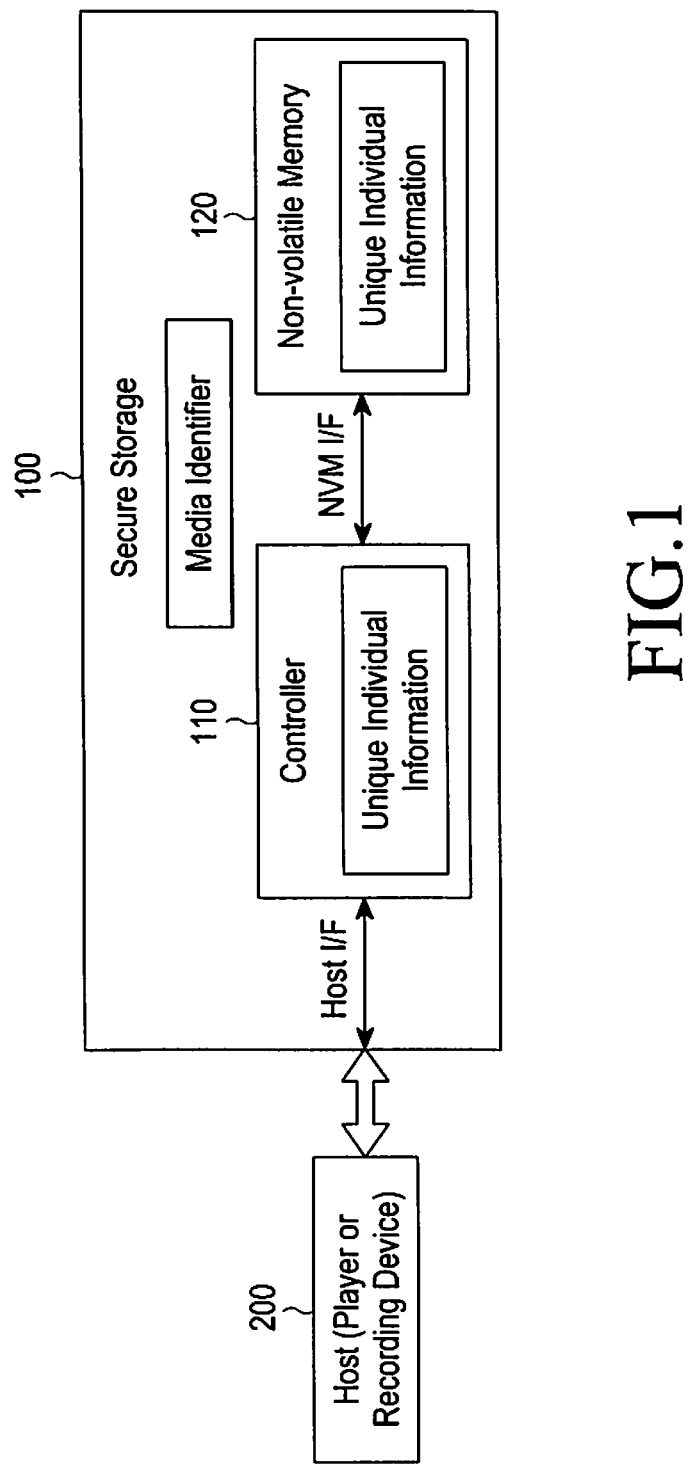
FIG. 1 is a block diagram of an initial structure of a secure (or security) storage, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

FIG. 1 is a block diagram of an initial structure of a secure (or security) storage, according to an embodiment of the present invention.

A secure storage 100 includes a controller 110 and a Non-Volatile Memory (NVM) 120. The storage 100 has a unique media Identifier (ID). In the present invention, the storage 100 is provided as a detailed example of a storage medium, but they may be used for the same meaning.

The controller 110 corresponds to a module A (or first module) in the storage 100, and has first Unique Individual Information (UII). The NVM 120 corresponds to a module B (or second module) in the storage 100, and has second UII. The UII corresponds to a unique ID for identifying an H/W or a module. The controller 110 may include a Central Processing Unit (CPU), a volatile memory, and so forth, and communicates with a host 200 (for example, receives a data processing command) through a host Interface (I/F). The NVM 120 communicates with the controller 110 through an NVM I/F, and the NVM 120 may communicate with the host 200 through a second host I/F or through the controller 110 and the host I/F.

The host 200 is a device that uses the storage 100, such as, for example, a Personal Computer (PC), a mobile phone, a camera, etc., and an I/F for the storage 100, such as, for example, a Digital Television (DTV). The host 200 may be a terminal including a controller, a display unit, an input device, a memory, a wired/wireless communication unit, and so forth. The host 200 may be a player for playing content stored in the storage 100, or a recording device for storing new content in the storage 100. More specifically, communication between the host 200 and the storage 100 varies according to its applications, such as a protocol associated with a memory card system, e.g., Secure Digital (SD)/Multi Media Card (MMC) system, etc., and a protocol associated with a storage such as a hard disk, e.g., Advanced Technology Attachment(ATA)/Serial-ATA(S-ATA), etc.

The storage 100 may further include a security engine such as software or hardware for encryption/decryption. The controller 110 may include a Flash Translation Layer (FTL) for storing data in memory cells of the NVM 120 by properly controlling an access of the host 200 to a file system. The storage 100 may be mounted as an embedded device on a smart phone, a tablet PC, or the like, and may be mounted or attached as an external device.

Thereafter, each of the controller 110 and the NVM 120 of the storage 100 further stores authentication information.

Figure 2:
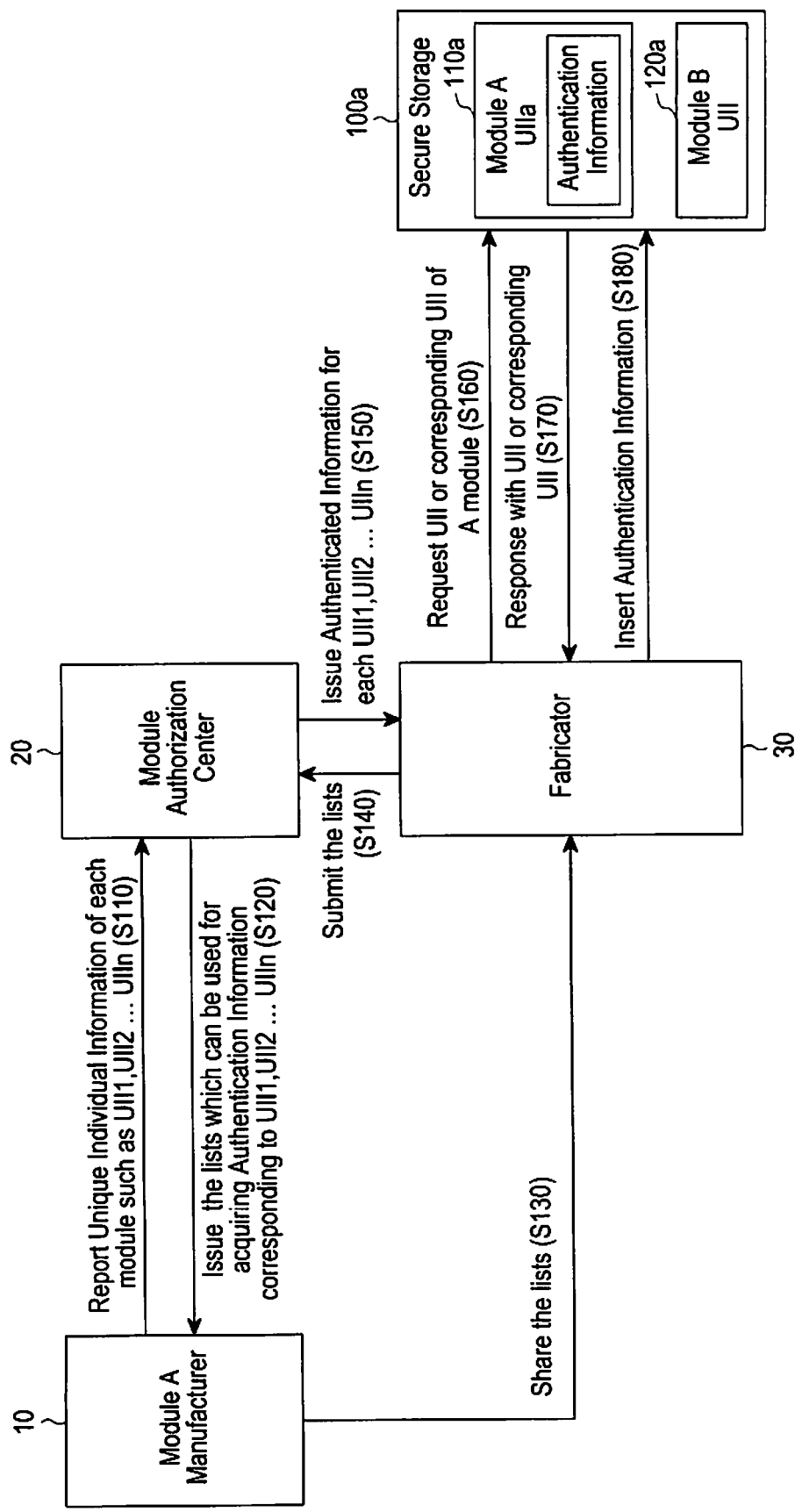
FIG. 2 is a diagram illustrating a method for storing authentication information, according to an embodiment of the present invention.

FIG. 2 is a diagram illustrating a method for storing authentication information, according to an embodiment of the present invention. The storing method is described based on an embodiment in which a fabricator 30 of a storage 100a (or a storage fabricator 30), rather than a module A manufacturer 10 of a module A 110a, is provided in the storage 100a.

Authentication information of the module A 110*a* between the module A 110*a* and a module B 120*a* to which their UII is allocated is stored.

The module A manufacturer 10 manufactures first through n$^{th}$ modules, and allocates and stores UII for each module. Thereafter, the module A manufacturer 10 reports (A–1)$^{th}$ through (A–n)$^{th}$ UII allocated and stored for the first through n$^{th}$ modules to a module authorization center 20, in step S110.

The module authorization center 20 registers the (A–1)$^{th}$ through (A–n)$^{th}$ UII in a database, and generates (A–1)$^{th}$ through (A–n)$^{th}$ authentication information corresponding to the (A–1)$^{th}$ through (A–n)$^{th}$ UII.

The module authorization center 20 issues (or generates) a UII list including the (A–1)$^{th}$ through (A–n)$^{th}$ UII, and transmits the UII list to the module A manufacturer 10, in step S120. The module authorization center 20 may transmit the (A–1)$^{th}$ through (A–n)$^{th}$ authentication information, together with the UII list. The UII list may be used to acquire corresponding authorization information.

The module A manufacturer 10 transmits the UII list to the storage fabricator 30 in step S130.

The storage fabricator 30 submits the UII list to the module authorization center 20 in step S140, and in response to the UII list, receives and secures an authentication information list corresponding to the UII list, that is, the (A–1)$^{th}$ through (A–n)$^{th}$ authentication information, in step S150.

The storage fabricator 30 requests the UII from the storage 100*a* or the module A 110*a* in step S160, and receives a corresponding UII, UIIa, from the storage 100*a* or the module A 110*a*, in step S170.

The storage fabricator 30 selects or determines authentication information corresponding to the UII of the module A 110*a*, and inserts and stores the determined authentication information in the module A 110*a*, in step S180. For example, the storage fabricator 30 may search for the (A–1)$^{th}$ authentication information corresponding to the received UII (e.g., the (A–1)$^{th}$ UII) in the authentication information list, and store the found (A–1)$^{th}$ authentication information in the module A 110*a* (e.g., a first module A).

In this embodiment of the present invention, the module A manufacturer 10, the storage fabricator 30, or the module authorization center 20 may be a computer, which includes a controller, a display unit, an input device, a memory, a wired/wireless communication unit, and so forth. Communication between computers may be performed in a wired or wireless manner.

Figure 3:
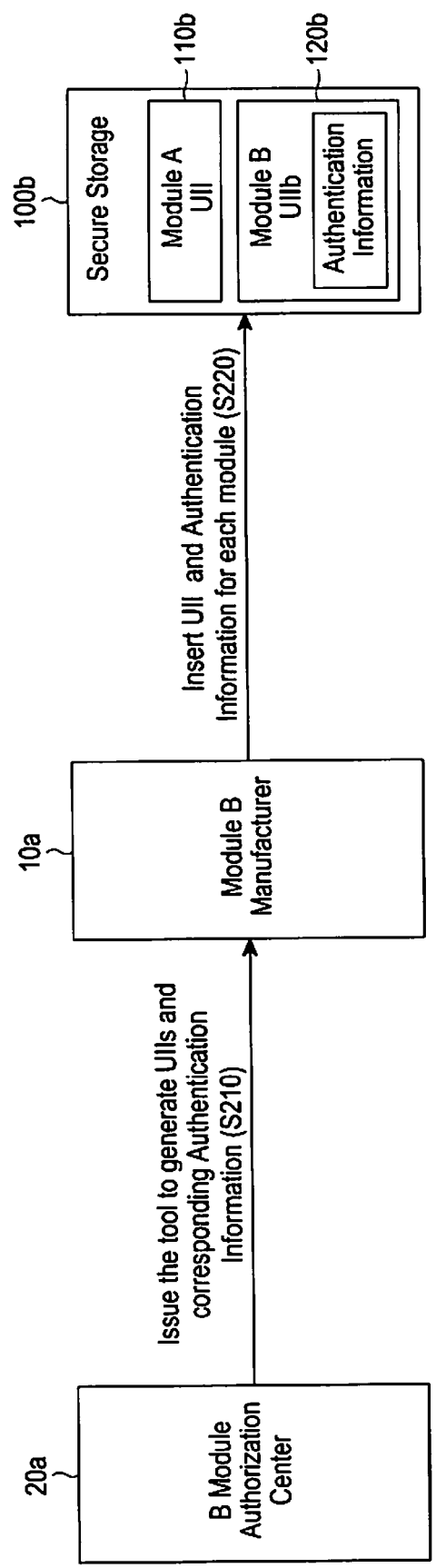
FIG. 3 is a diagram illustrating a method for storing authentication information, according to an embodiment of the present invention.

FIG. 3 is a diagram illustrating a method for storing authentication information, according to an embodiment of the present invention. The storing method is based on an embodiment in which a module B manufacturer 10*a* stores authentication information of a module B 120*b* to be included in a storage 100*b* having a module A 110*b* allocated with an UII. Although the module B 120*b* is included in the storage 100*b* to facilitate understanding in FIG. 3, the storing method is executed before the module B 120*b* is provided to the storage 100*b*. However, the storing method may also be carried out through online communication in a state where the module B 120*b* is provided to the storage 100*b*.

A B module authorization center 20*a* transmits a UII list and an authentication information list to the module B manufacturer 10*a*, or provides a tool (S/W or H/W) capable of generating a UII and related authentication information to the module B manufacturer 10*a*, in step S210.

The module B manufacturer 10*a* inserts and stores UIIb and related authentication information in the manufactured module B 120*b*, in step S220. For example, the module B manufacturer 10*a* may allocate and store (B–2)$^{th}$ UII and (B–2)$^{th}$ authentication information to the manufactured module B (e.g., a second module B).

In an embodiment of the present invention, UII may be a random value or encoded error-correctable information. Various encryption schemes, such as a symmetric key, an asymmetric key, and so forth, may be applied to authentication information associated with UII. For example, a certificate to which a well-known PKI is applied may be used as the authentication information. A certificate using a PKI, used as the authentication information, "Certificate (Authentication Information)" may be expressed as follows:

Certificate (Authentication Information)=Signature (Private Key of Authorization Center, UII, data)

Specifically, the certificate "Certificate (Authentication Information)" may include an electronic signature value "Signature" of an authorization center, and the electronic signature value indicates a value for signing UII and/or data with a private key of an authorization center "Private Key of Authorization Center". The data includes other certificate-related information, such as a valid period of the certificate, a use target of the certificate, and so forth.

Figure 4:
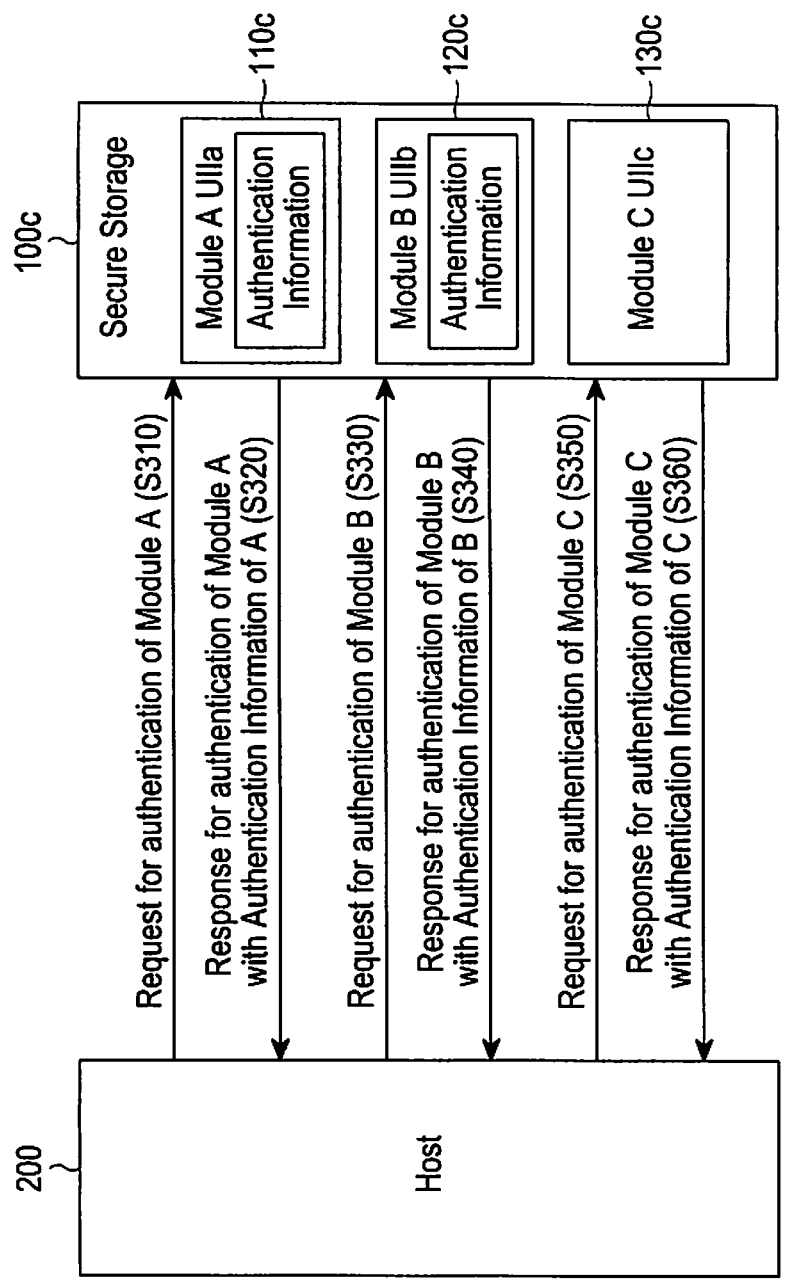
FIG. 4 is a diagram illustrating a method for authenticating a storage, according to an embodiment of the present invention.
Figure 5:
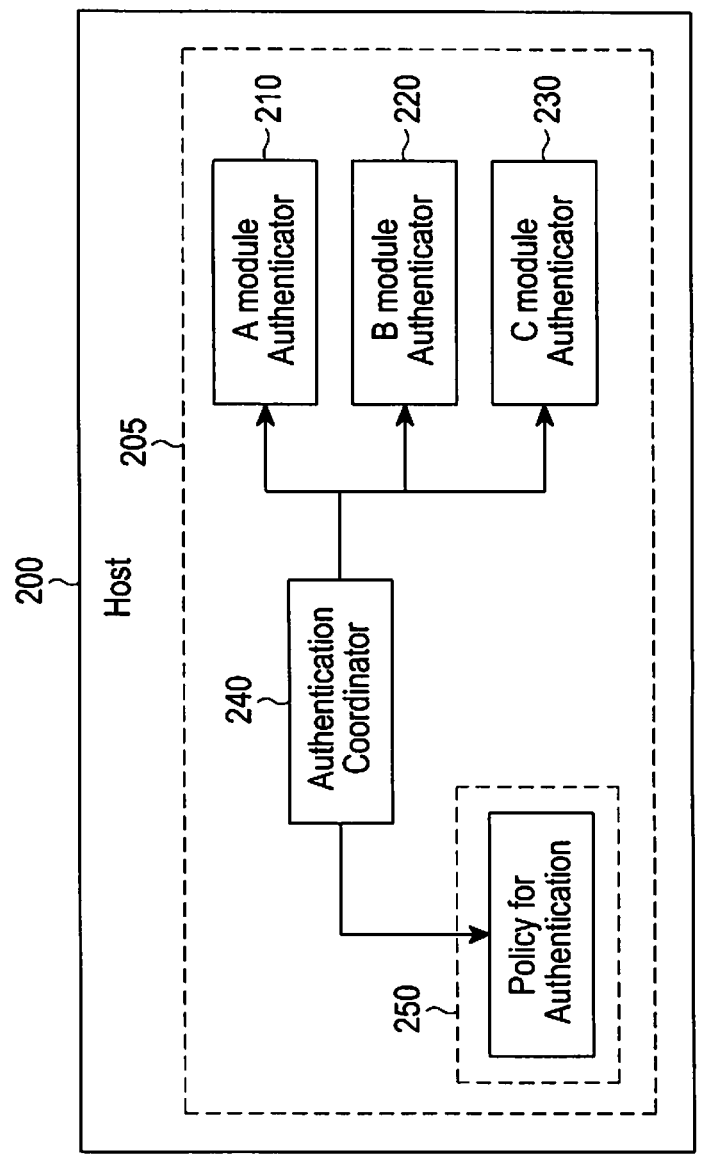
FIG. 5 is a diagram illustrating a host related to an authentication method shown in FIG. 4, according to an embodiment of the present invention.

FIG. 4 is a diagram illustrating a method for authenticating a storage, according to an embodiment of the present invention. FIG. 5 is a diagram illustrating a main structure of a host related to the authentication method, according to an embodiment of the present invention.

The host 200 includes an A module authenticator 210, a B module authenticator 220, a C module authenticator 230, an authenticator coordinator 240, and a memory 250, which stores a policy for authentication, which forms an authentication unit 205 of the host 200. The A module authenticator 210, the B module authenticator 220, and the C module authenticator 230 may be referred to as first through third module authenticators, respectively.

The A module authenticator 210 requests first authentication information regarding a module A 110*c* among a plurality of modules integrated in a storage 100*c*, in step S310. The A module authenticator 210 receives and acquires first authentication information regarding the module A 110*c*, in step S320. The A module authenticator 210 authenticates the module A 110*c* based on first UII, UIIa, and first authentication information of the module A 110*c*. This procedure is referred to as an authentication protocol. The respective module authenticators 210, 220, and 230 may have already known the UII of the corresponding modules 110*c*, 120*c*, and 130*c*, or they may receive them from the storage 100*c*. Authentication information of a particular module may be received through a controller (the module A 110*c* in a current example) of the storage 100*c*, or directly from the particular module. For example, each of the module authenticators 210, 220, and 230 may decode UII of a corresponding module by applying an already known public key of a manufacturer of the module to an electronic signature value, which forms corresponding authentication information. Each of the module authenticators 210, 220 and 230 then compare the decoded UII with already known UII of the module, thus completing authentication with respect to the module.

The B module authenticator 220 requests second authentication information with respect to the module B 120*c* among the plurality of modules, in step S330. The B module authenticator 220 receives and acquires the second authentication information with respect to the module B 120*c*, in step 340. The B module authenticator 220 authenticates the module B 120*c* based on second UII, UIIb, and second authentication information of the module B 120*c*.

The C module authenticator 230 requests third authentication information with respect to the module C 130*c* among the plurality of modules, in step S350. The C module authenticator 230 receives and acquires the third authentication information with respect to the module C 130c, in step S360. The C module authenticator 230 authenticates the module C 130c based on third UII, UIIc, and third authentication information of the module C 130c.

Each of the module authenticators 210, 220, and 230 authenticates a corresponding module by using an authentication method based on an encryption scheme applied to corresponding authentication information. The module C 130c has no other authentication information than the third UII, such that the third authentication information is the third UII, which may have information necessary for authentication.

Although each piece of authentication information is described as being stored in a corresponding module, it may be stored in another module. For example, the first and second authentication information may be stored in the third module 130c.

Although authentication steps for respective modules are sequentially performed in the current example, those authentication steps may be performed in parallel or at the same time.

The memory 250 stores a previously set policy for authentication. The authentication policy defines rules regarding which modules out of the modules 110c, 120c, and 130c, included in the storage 100c, will be authenticated in which order and manner.

The authenticator coordinator 240 controls the module authenticators 210, 220, and 230 to perform authentication with respect to the storage 100c according to the authentication policy. The authenticator coordinator 240 may sequentially perform authentication protocols with respect to the first-order and second-order modules 110c and 120c based on a priority list regarding the plurality of modules 110c, 120c, and 130c included in the storage 100c, and permit an access to content stored in the storage 100c if both of the first-order and second-order modules 110c and 120c have been successfully authenticated.

In another embodiment with respect to the authentication policy, if authentication with respect to a particular module, e.g., the module B 120c, among the three modules 110c, 120c, and 130c included in the storage 100c fails, the authentication coordinator 240 may regard authentication with respect to the storage 100c as finally failing or as succeeding within a particular function. The particular function may be, for example, a read function, and in this case, the host 200 may permit only a read operation, and may not permit a write operation, with respect to the storage 100c.

Figure 6:
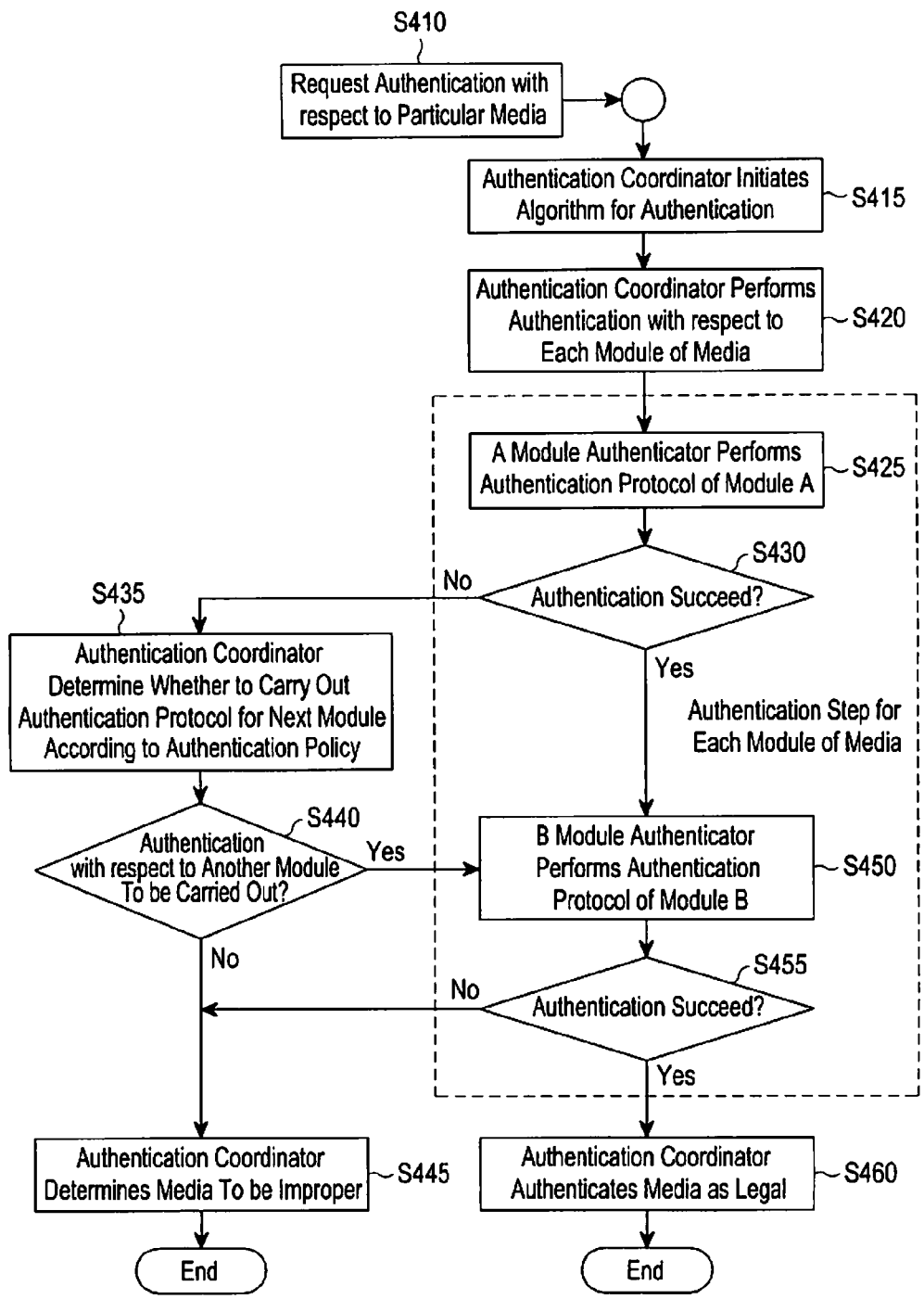
FIG. 6 is a flowchart illustrating a method for authenticating a storage, according to an embodiment of the present invention.

FIG. 6 is a flowchart illustrating a method for authenticating a storage, according to an embodiment of the present invention. FIGS. 4 and 5 illustrate a device structure associated with the authenticating method.

The host 200 receives an authentication request with respect to the storage 100c, in step S410. For example, this authentication request receiving step may correspond to a step of receiving a content-related command, such as content view, content play, etc., issued by a user, through an input device included in the host 200, such as a keyboard, a keypad, a key button, a mouse, a touch screen, or the like.

The authentication coordinator 240 initiates an algorithm for authenticating the storage 100c, in step S415. Specifically, the authentication coordinator 240 reads an authentication policy stored in the memory 250 and operates according to an algorithm corresponding to the authentication policy.

The authentication coordinator 240 sequentially controls the A module authenticator 210 and the B module authenticator 220 according to the following procedure, in step S420.

The A module authenticator 210 authenticates the module A 110c by performing an authentication protocol defined in the authentication policy, in step S425. The A module authenticator 210 requests first authentication information about the module A 110c among the plurality of modules integrated in the storage 100c, and receives and acquires the first authentication information regarding the module A 110c. The A module authenticator 210 authenticates the module A 110c based on the first UII and first authentication information of the module A 110c.

In step S430 it is determined whether authentication has succeeded. If authentication with respect to the module A 110c fails ("No" in step S430), the authentication coordinator 240 determines whether to carry out an authentication procedure for another module according to the authentication policy, in steps S435 and S440.

If it is determined that authentication with respect to another module is not to be carried out ("No" in step S440), then the authentication coordinator 240 authenticates the storage 100c as improper, in step S445. Specifically, the authentication coordinator 240 determines or regards authentication with respect to the storage 100c to fail or as failing, and prohibits an access to all or some of content stored in the storage 100c or prohibits execution of all functions or a particular function (read, write, etc.) with respect to the storage 100c.

If authentication with respect to the module A 110c succeeds ("Yes" in step S430) or it is determined that authentication with respect to another module is to be carried out ("Yes" in step S440), the B module authenticator 220 authenticates the module B 120c according to an authentication protocol defined in the authentication policy. The B module authenticator 220 requests second authentication information regarding the module B 120c among the plurality of modules integrated in the storage 110c, and receives and acquires the second authentication information regarding the module B 120c. The B module authenticator 220 authenticates the module B 120c based on second UII and second authentication information of the module B 120c.

In step S455, it is determined whether the authentication has succeeded. If authentication with respect to the module B 120c fails ("No" in step S455), the authentication coordinator 240 determines or regards authentication with respect to the storage 100c to fail or as failing, in step S445.

If authentication with respect to the module B 120c succeeds ("Yes" in step S455), the authentication coordinator 240 authenticates the storage 100c as legal (or proper), in step S460. Specifically, the authentication coordinator 240 determines or regards authentication with respect to the storage 100c to succeed or as succeeding, and permits an access to content stored in the storage 100c or execution of all functions or a particular function (read, write, etc.) with respect to the storage 100c.

Figure 7:
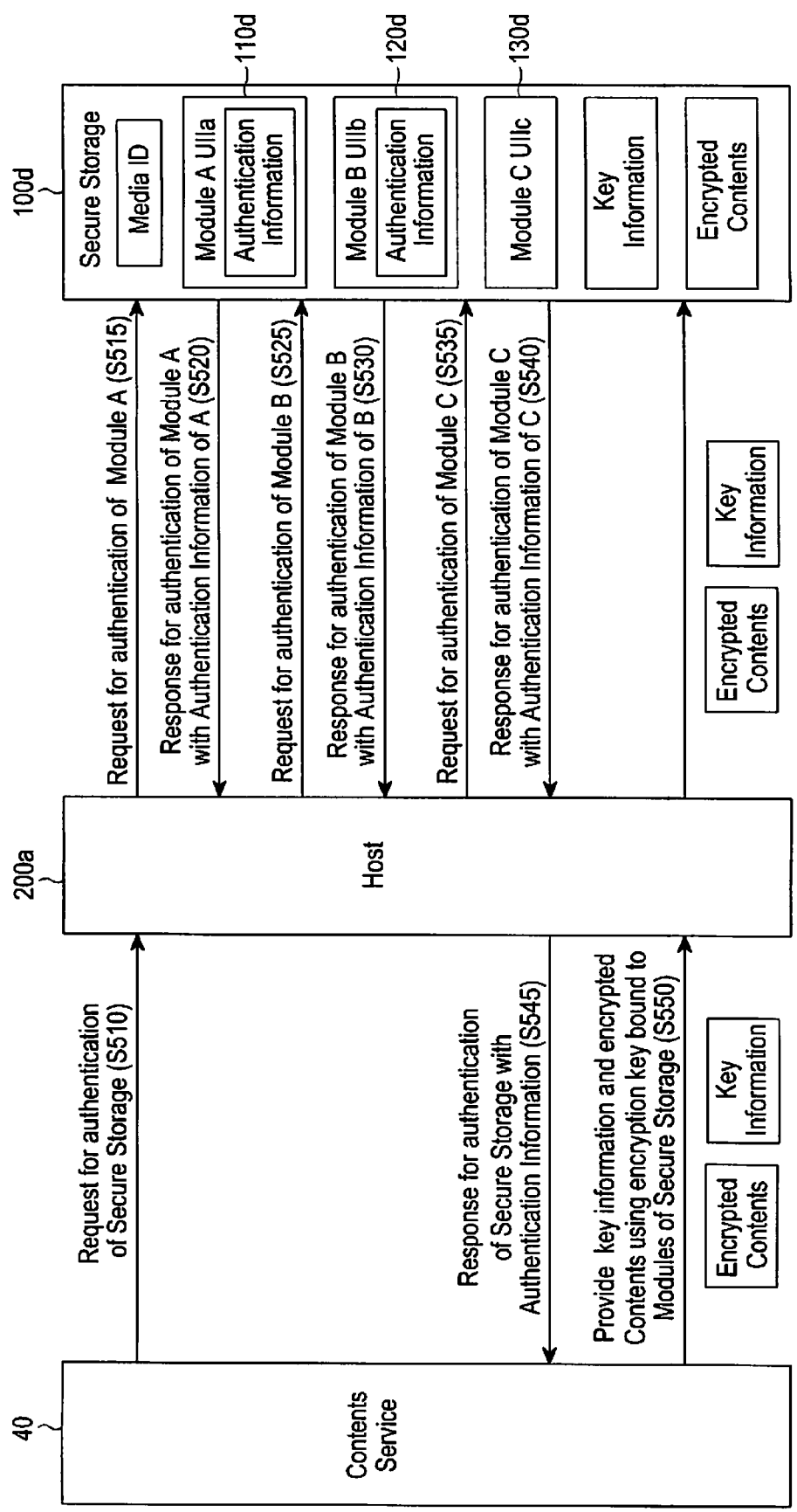
FIG. 7 is a diagram illustrating a method for storing/recording encrypted content, according to an embodiment of the present invention.

FIG. 7 is a diagram illustrating a method for storing/recording encrypted content, according to an embodiment of the present invention. Recording is one example of storage. In FIG. 7, a host 200a requests a content service from a content service server 40 in an on-demand manner, and stores content provided from the content service server 40 in the storage 100d. The content service server 40 may be a computer including a controller, a display unit, an input device, a memory, a wired/wireless communication unit, etc. The host 200a has the same structure as the host 200, illustrated in FIG. 5.

The host 200a requests a content service from the content service server 40 in response to a content service request, which is input from a user through an input device.

The content service server 40 sends a request for authentication of the storage 100d to the host 200a, in step S510. The host 200a may also automatically perform authentication with respect to the storage 100d without receiving the request for authentication from the content service server 40.

When all of the modules A, B, and C 110d, 120d, and 130d are authenticated, the host 200a sends requests for first through third authentication information regarding the modules A, B, and C 110d, 120d, and 130d integrated in the storage 100d to the storage 100d by using the A, B, and C module authenticators 210, 220, and 230, in steps S515, S525, and S535, and receives and acquires the first through third authentication information, in steps S520, S530, and S540. The A, B, and C module authenticators 210, 220, and 230 authenticate the modules A, B, and C 110d, 120d, and 130d based on the first through third UII, UIIa, UIIb, and UIIc, and the first through third authentication information.

The host 200a sends an authentication result with respect to the storage 100d and authentication-related information to the content service server 40, in step S545. The authentication result with respect to the storage 100d may not be explicitly indicated, and for example, if authentication with respect to the storage 100d succeeds, the authentication-related information is transmitted to the content service server 40. If authentication with respect to the storage 100d fails, the failure may be notified without provisioning of the authentication-related information. The authentication-related information includes the first through third authentication information, the first through third UII, and a media ID of the storage 100d.

The content service server 40 may also authenticate the storage 100d by using the authentication-related information.

The content service server 40 includes an encryption/decryption device for encrypting content by using the authentication-related information. The content service server 40 transmits the encrypted content and the key information to the host 200a, in step S550. The host 200a stores or records the encrypted content and the key information in the storage 100d.

Figure 8:
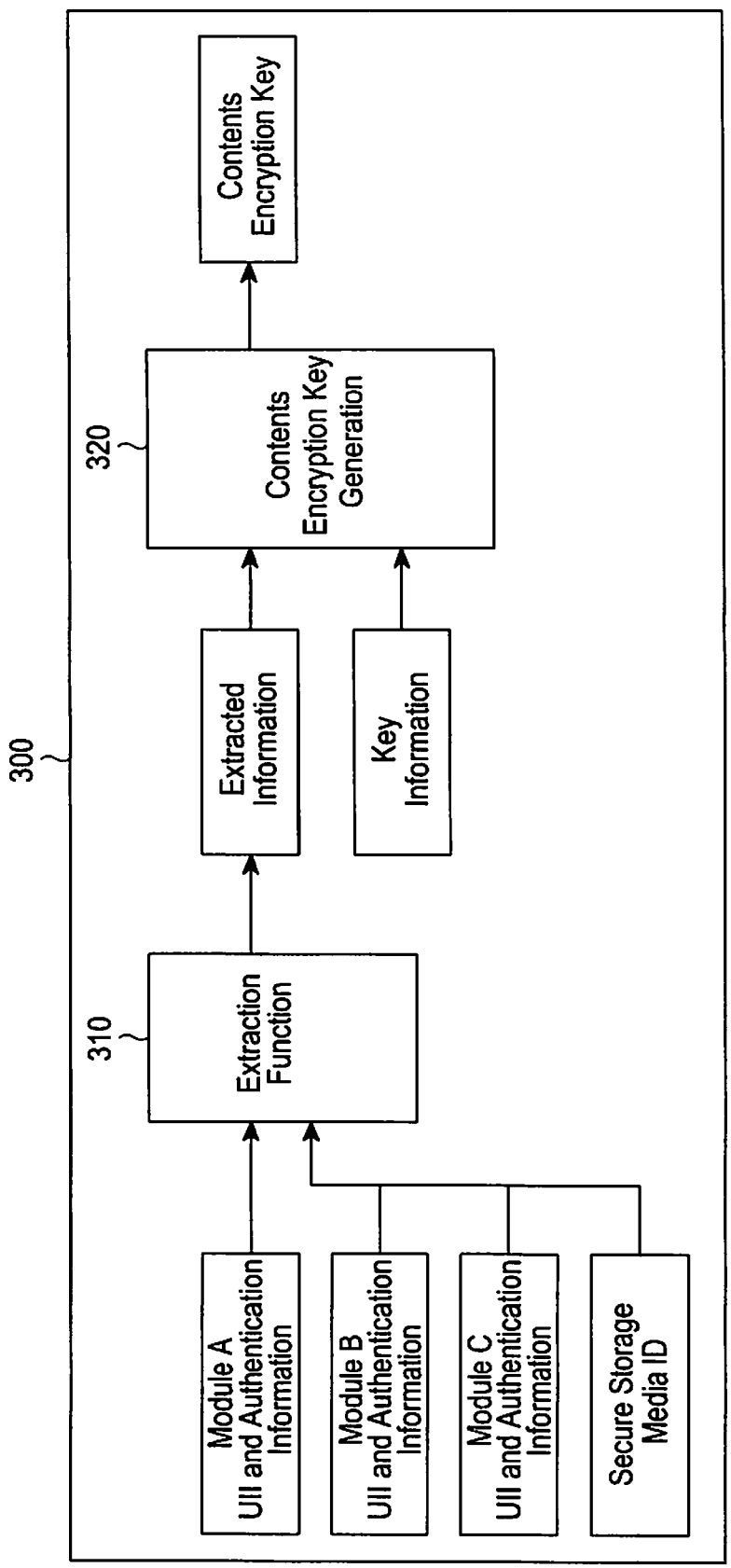
FIG. 8 is a diagram illustrating a main structure of an encryption/decryption device, according to an embodiment of the present invention.

FIG. 8 is a diagram illustrating a main structure of an encryption/decryption device, according to an embodiment of the present invention. FIG. 8 only illustrates components associated with the generation of a content encryption key. For example, an encryption/decryption device 300 may further include a content encryption block for encrypting content by using the content encryption key, a content decryption block for decrypting encrypted content by using key information, and so forth. A block or a function refers to a functional block or module for performing a corresponding function.

The encryption/decryption device 300 generates a content encryption key associated with or binding (or generated based on) the first through third UII and the first through third authentication information of the modules A, B, and C 110d, 120d, and 130d. Alternatively, the content encryption key may be associated with a media ID of the storage 100d.

Specifically, the encryption/decryption device 300 generates a content encryption key by integrating the media ID of the storage 100d in which content are to be stored and UII and authentication information of each of the modules 110d, 120d, and 130d.

An extraction function 310 receives the first through third UII and first through third authentication information of the modules A, B, and C 110d, 120d, and 130d, and the media ID of the storage 100d, and outputs information associated with all or part of the input information (i.e., extracted information). The extraction function 310 may be a unidirectional encryption function as set forth below in Equation (1).

Extraction Function F=Hash (UII of Module A||Authentication Information, Hash (UII of Module B, Authentication Information), . . . )  (1)

Hash ( ) refers to a typical hash function, and as described above, another hash function may be included in the hash function. The concatenation operator, ||, concatenates its right operand (i.e., Authentication Information) to the end of its left operand (i.e., UII of Module A). The extracted information output from the extraction function 310 corresponds to an output value of the hash function, which uses UII and authentication information of each of the modules 110d, 120d, and 130d.

A content encryption key generation function 320 receives the extracted information output from the extraction function 310 and key information, and generates and outputs a content encryption key associated with them.

The content encryption key generation function 320 may be embodied as a well-known encryption algorithm, and information such as the key information may be generated at random (that is, as a random value), as set forth in Equation (2) below. AES is a symmetric key encryption system, and AES-Hash is a unidirectional hash function, which uses a symmetric encryption system.

content encryption key Generation Function G=AES-Hash (Extracted Information, Key Information)  (2)

The encryption/decryption device 300 generates a content encryption key through the extraction function 310 and the content encryption key generation function 320, and encrypts content using the content encryption key.

The content service server 40 transmits the encrypted content and the key information to the host 200a, as illustrated in step S550 of FIG. 7.

Figure 9:
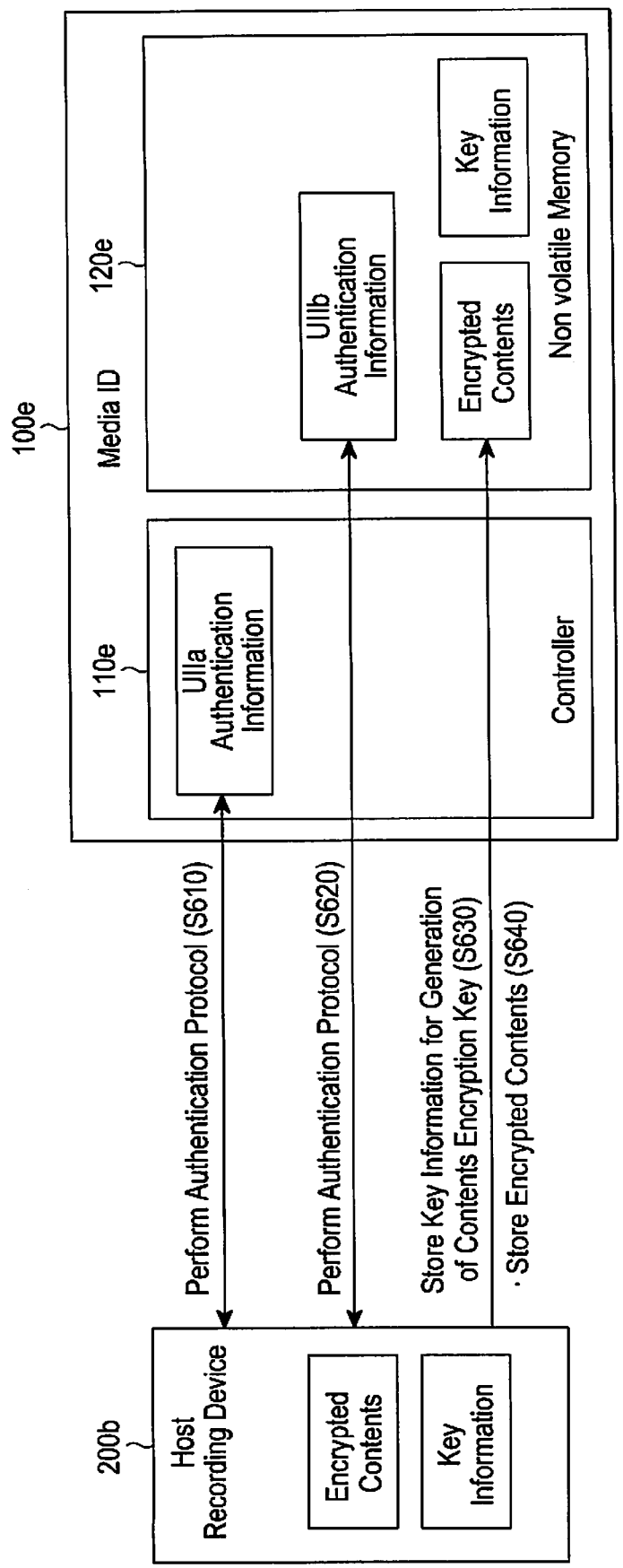
FIG. 9 is a diagram illustrating a method for storing/recording encrypted content, according to an embodiment of the present invention.

FIG. 9 is a diagram illustrating a method for storing/recording encrypted content, according to an embodiment of the present invention. FIG. 9 shows an example where a host 200b directly encrypts content. The host 200b has a structure similar to the host 200 shown in FIG. 5, and the host 200b further includes the encryption/decryption device 300 shown in FIG. 8.

The host 200b directly generates the key information and performs content encryption. In particular, when content that are broadcast by the content service server 40 are stored by the host 200b in a storage 100e, the host 200b may generate a content encryption key.

The host 200b sequentially performs authentication protocols with respect to a controller 110e and a non-volatile memory 120e (which correspond to modules A and B, respectively) integrated in the storage 100e, by using A and B module authenticators, in steps S610 and S620.

Specifically, the host 200b, requests, receives, and acquires first and second authentication information, and authenticates the controller 110e and the non-volatile memory 120e based on first and second UII and first and second authentication information, by using the A and B module authenticators.

The encryption/decryption device included in the host 200b generates extracted information, which is associated with or bound to the first and second UII and the first and second authentication information of the controller 110e and the non-volatile memory 120e, by using the extraction function. The encryption/decryption device also generates key information, and generates and outputs a content encryption key bound to or associated with the extracted information and the key information.

The host 200b encrypts content by using the generated content encryption key, and stores or records the key information and the encrypted content in the non-volatile memory 120e of the storage 100e, respectively in steps S630 and S640.

Figure 10:
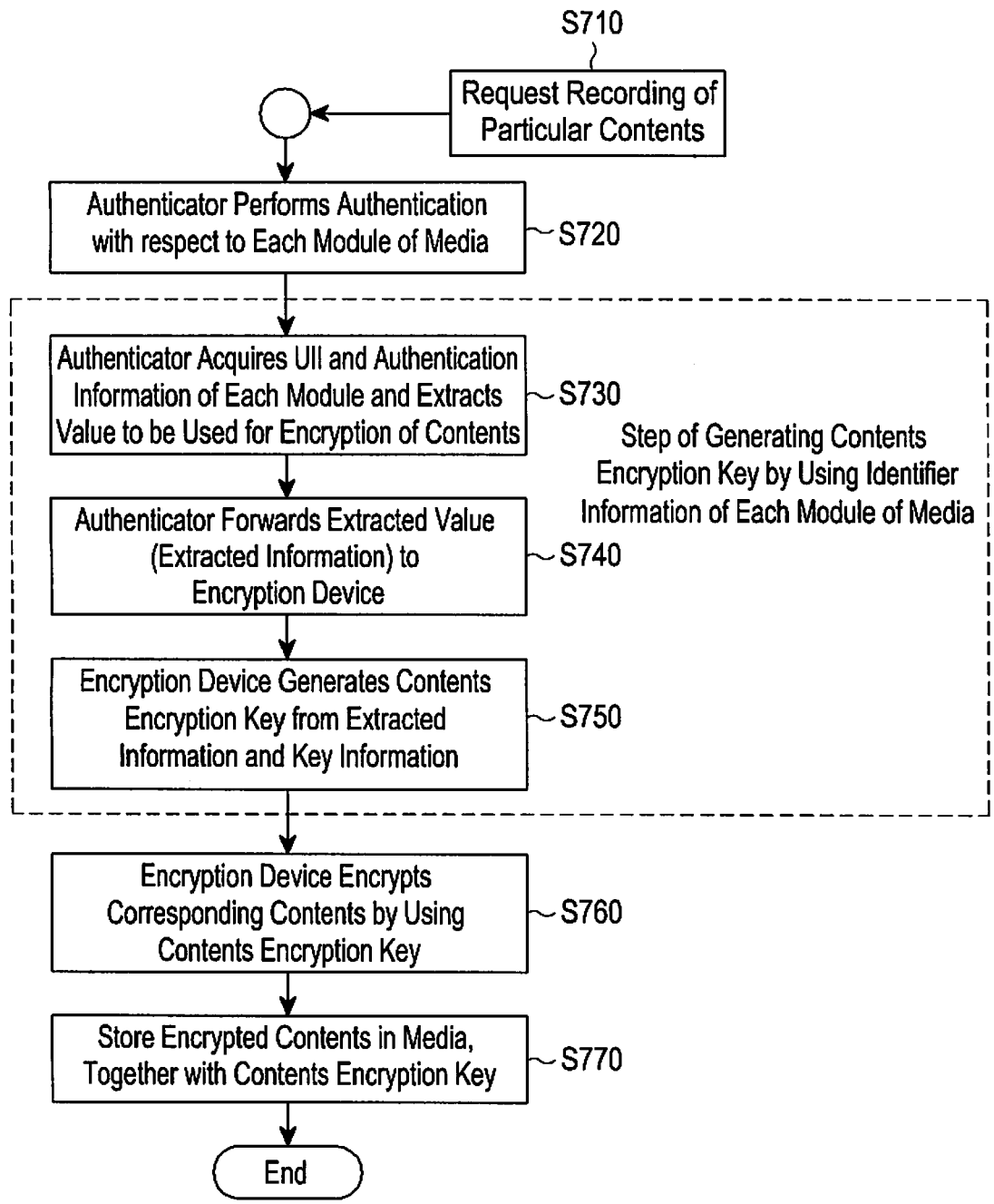
FIG. 10 is a flowchart illustrating a method for storing/recording encrypted content, according to an embodiment of the present invention.
Figure 11:
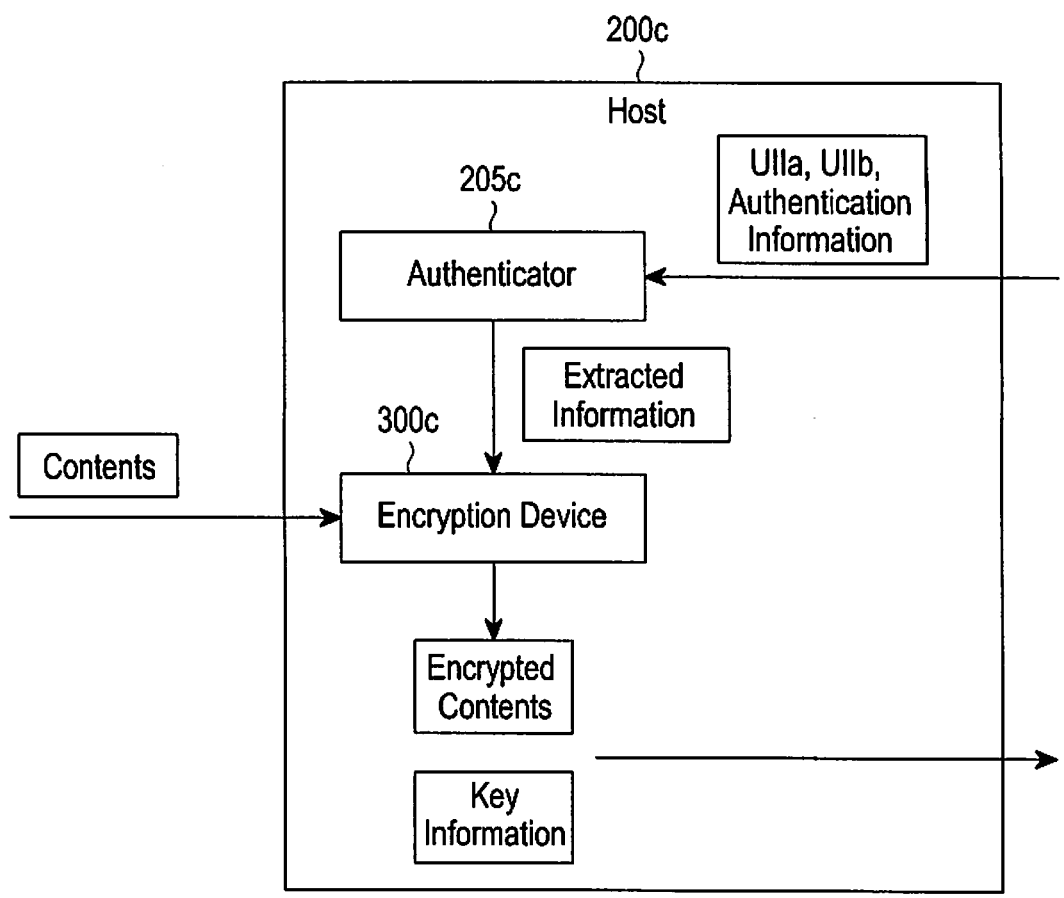
FIG. 11 is a diagram illustrating a main structure of a host related to FIG. 10, according to an embodiment of the present invention.

FIG. 10 is a flowchart illustrating a method for storing/recording encrypted content, according to an embodiment of the present invention. FIG. 11 is a diagram illustrating a main structure of a host related to FIG. 10, according to an embodiment of the present invention. A storing operation will be performed with respect to the storage 100e shown in FIG. 9.

A host 200c receives a request for storing/recording particular content, in step S710. For example, this storing/recording request receiving step may correspond to a step of receiving a content recording or storing command issued by the user through an input device included in the host 200c.

An authenticator 205c included in the host 200c has a structure similar to the authenticator 205 shown in FIG. 5, and further includes the extraction function 310 shown in FIG. 8. The authenticator 205c requests, receives and acquires UII, UIIa and UIIb, and authentication information regarding a plurality of modules 110e and 120e integrated in the storage 100e by using a plurality of module authenticators. The authenticator 205c authenticates the storage 100e based on the first and second UII, UIIa and UIIb, and the first and second authentication information regarding the controller 110e and the non-volatile memory 120e, in step S720.

The authenticator 200c generates extracted information associated with the UII and authentication information regarding the controller 110e and the non-volatile memory 120e by using an extraction function, in step S730.

The authenticator 200c forwards the extracted information to an encryption device 300c, in step S740.

The encryption device 300c has a structure similar to the encryption/decryption device shown in FIG. 8, but does not include the extraction function 310. The encryption device 300c generates key information, and generates a content encryption key associated with the extracted information and the key information by using a content encryption key generation function, in step S750.

The encryption device 300c encrypts content by using the content encryption key in step S760.

The encryption device 300c stores the encrypted content and the key information in the storage 100e, in step S770.

Figure 12:
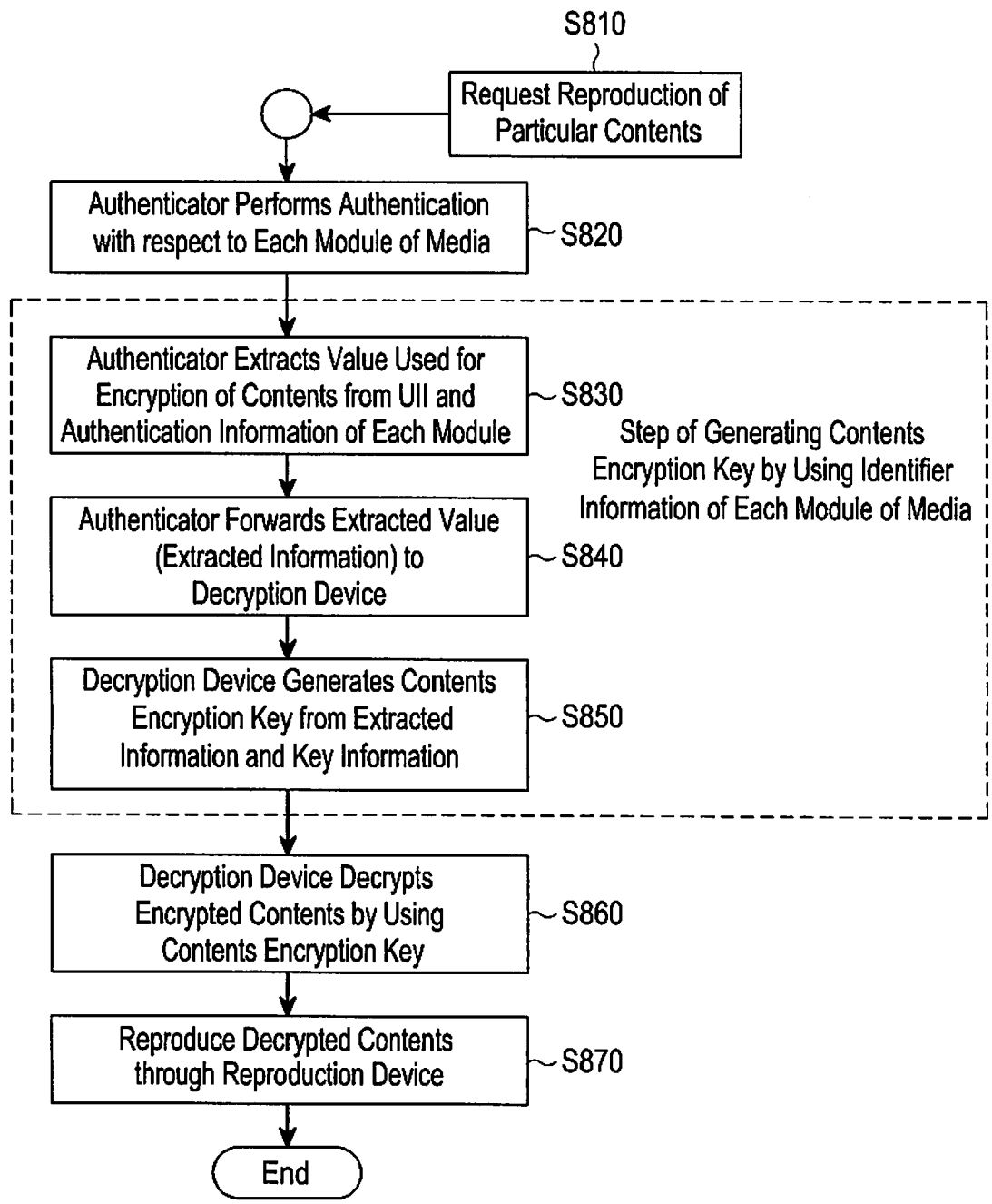
FIG. 12 is a flowchart of a method for reproducing encrypted content, according to an embodiment of the present invention.
Figure 13:
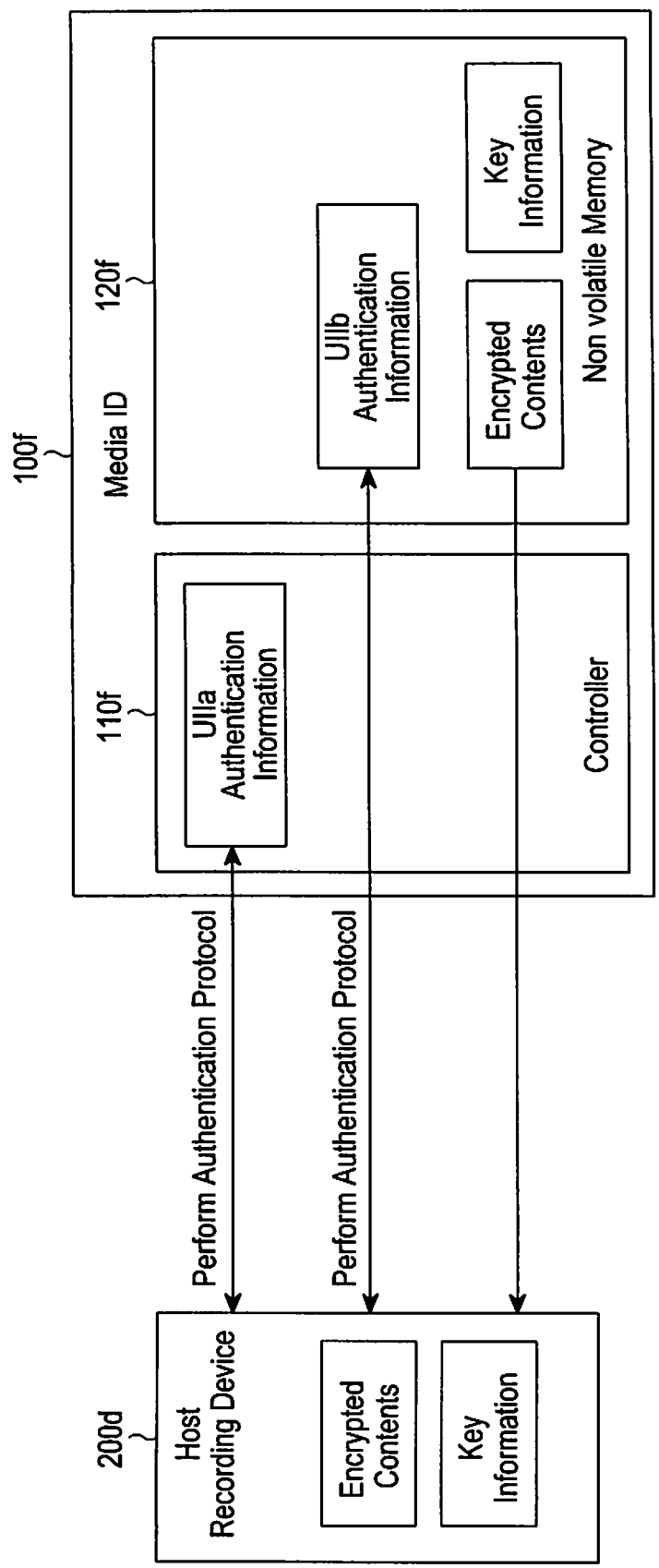
FIG. 13 is a diagram for describing a method for reproducing encrypted content, according to an embodiment of the present invention.
Figure 14:
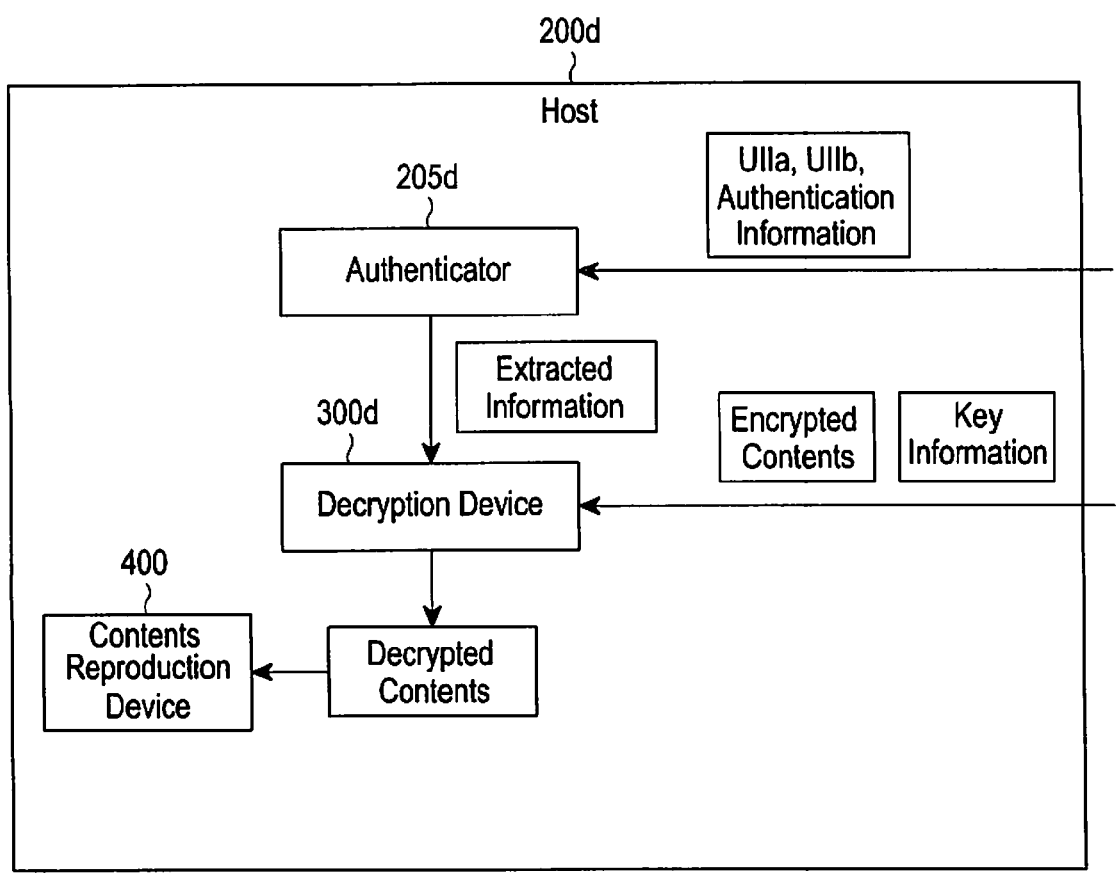
FIG. 14 is a diagram illustrating a main structure of a host related to FIG. 12, according to an embodiment of the present invention.

FIG. 12 is a flowchart illustrating a method for reproducing encrypted content, according to an embodiment of the present invention. FIG. 13 is a diagram illustrating a method for reproducing encrypted content, according to an embodiment of the present invention. FIG. 14 is a diagram illustrating a main structure of a host related to FIG. 12, according to an embodiment of the present invention.

A host 200d receives a request for reproducing particular content, in step S810. For example, this reproducing request receiving step may correspond to a step of receiving a content reproduction command issued by a user through an input device provided in the host 200d.

An authenticator 205d included in the host 200d has a structure that is similar to the authenticator 205 shown in FIG. 5, and further includes the extraction function 310 shown in FIG. 8. The authenticator 205d sequentially performs authentication protocols regarding a controller 110f and a non-volatile memory 120f integrated in a storage 100f by using a plurality of module authenticators, in step S820. Specifically, the host 200d requests, receives and acquires the first and second UII, UIIa and UIIb, and the first and second authentication information. The authenticator 205d authenticates the storage 100f based on the first and second UII and the first and second authentication information regarding the controller 110f and the non-volatile memory 120f.

After authentication with respect to the storage 100f succeeds, the host 200d receives the encrypted content and the key information from the storage 100f.

The authenticator 205d generates extracted information associated with the UII and authentication information regarding the controller 110f and the non-volatile memory 120f, by using the extraction function, in step S830.

The authenticator 205d forwards the extracted information to the decryption device 300d, in step S840.

The decryption device 300d receives the key information, and generates a content encryption key associated with the extracted information and the key information by using a content encryption key generation function, in step S850.

The decryption device 300d decrypts the encrypted content by using the content encryption key, in step S860.

The decryption device 300d forwards the decrypted content to a content reproduction device 400.

The content reproduction device 400 reproduces the decrypted content, in step S870.

In embodiments of the present invention, an access to content refers to operations, such as reproducing, moving, copying, reading, storing, deleting content, and so forth.

In the foregoing examples, a first UII of a controller, i.e., a module A (or a first module), in a storage, and a second UII of a non-volatile memory, i.e., a module B (or a second module), in the storage, are unique identifiers. In the foregoing authenticating methods, authentication is performed using such UII. The UII may be a unique identifier arbitrarily selected or may be a value calculated by a particular operation. For example, the UII of the second module may be calculated as set forth in Equation (3) below.

$$\text{Enhanced Media ID} = \text{Hash (Identifier Information of Second Module, Prefixed Information of Second Module)} \quad (3)$$

Enhanced Media ID (EMID) refers to the UII of the second module, the identifier information of the second module refers to an identifier which, for example, a module manufacturer allocated to the second module, and the prefixed information refers to content or application additional information which is a value allocated according to a type of content stored in the second module (e.g., multimedia data such as moving pictures, still pictures, etc., financing information such as bank accounts, private information such as contact numbers, and so forth) or a type of applications (or provided services) accessing the content (e.g., multimedia applications, financing-related applications, private-information-related applications, and so forth). The prefixed information may be stored in only a host or both the host and the storage.

More specifically, embodiments of the present invention may allocate a plurality of UII to a single module according to a type of content or a type of applications. An authenticating method according to embodiments of the present invention may be performed based on UII corresponding to a type of corresponding content or a type of a corresponding application.

For example, referring to FIGS. 4 and 5, when requesting the second authentication information regarding the module B 120c, the B module authenticator 220 may request the second authentication information allocated to multimedia data, if content that the storage 100c desires to access are the multimedia data or if a currently running application that accesses content is a multimedia application. The B module authenticator 220 may authenticate the module B 120c based on the second UII and the second authentication information, which are associated with the multimedia data of the module B 120c. The module B 120c may store a plurality of second UII corresponding to a plurality of content types or a plurality of application types, and a plurality of second authentication information corresponding to the plurality of second UII.

The EMID generated based on identifier information and prefixed information of a module may be applied in different manners in accordance with embodiments of the present invention, and may be used, for example, to generate a content encryption key or generate additional authentication information.

Referring to FIGS. 7 and 8, the extraction function 310 generates an EMID based on second UII of the module B 120d and already-known prefixed information of the module B 120d. The extraction function 310 outputs extracted information based on the EMID and the first UII of the module A 110d. The extracted information may be indicated as set forth below.

EX 1) Extracted Information=Media ID XOR EMID
EX 2) Extracted Information=Media ID∥EMID In the foregoing examples, Media ID corresponds to the first UII of the module A 110d.

The content encryption key generation function 320 may receive the extracted information output from the extraction function 310 and the key information, which is a random value, and may generate and output the content encryption key associated with the extracted information and the key information.

While a storage is determined to be legal if authentication regarding modules is successful in the foregoing embodiments, additional authentication information using an EMID may be further provided. If authentication of the additional authentication information succeeds, the storage may be determined to be legal. The additional authentication information may be used to authenticate modules in place of authentication of each module shown in FIG. 6. Specifically, if the additional authentication information is determined to be valid, the storage may be determined to be legal.

An additional authentication information generation device has a structure similar to the encryption/decryption device 300 shown in FIG. 8, and may be provided in a content service server or a host. The additional authentication information may be generated using the encryption/decryption device 300 shown in FIG. 8 or the encryption device 300c shown in FIG. 11. Hereinafter, the additional authentication information generation device is embodied as being provided in the content service server 40 shown in FIG. 7.

Figure 15:
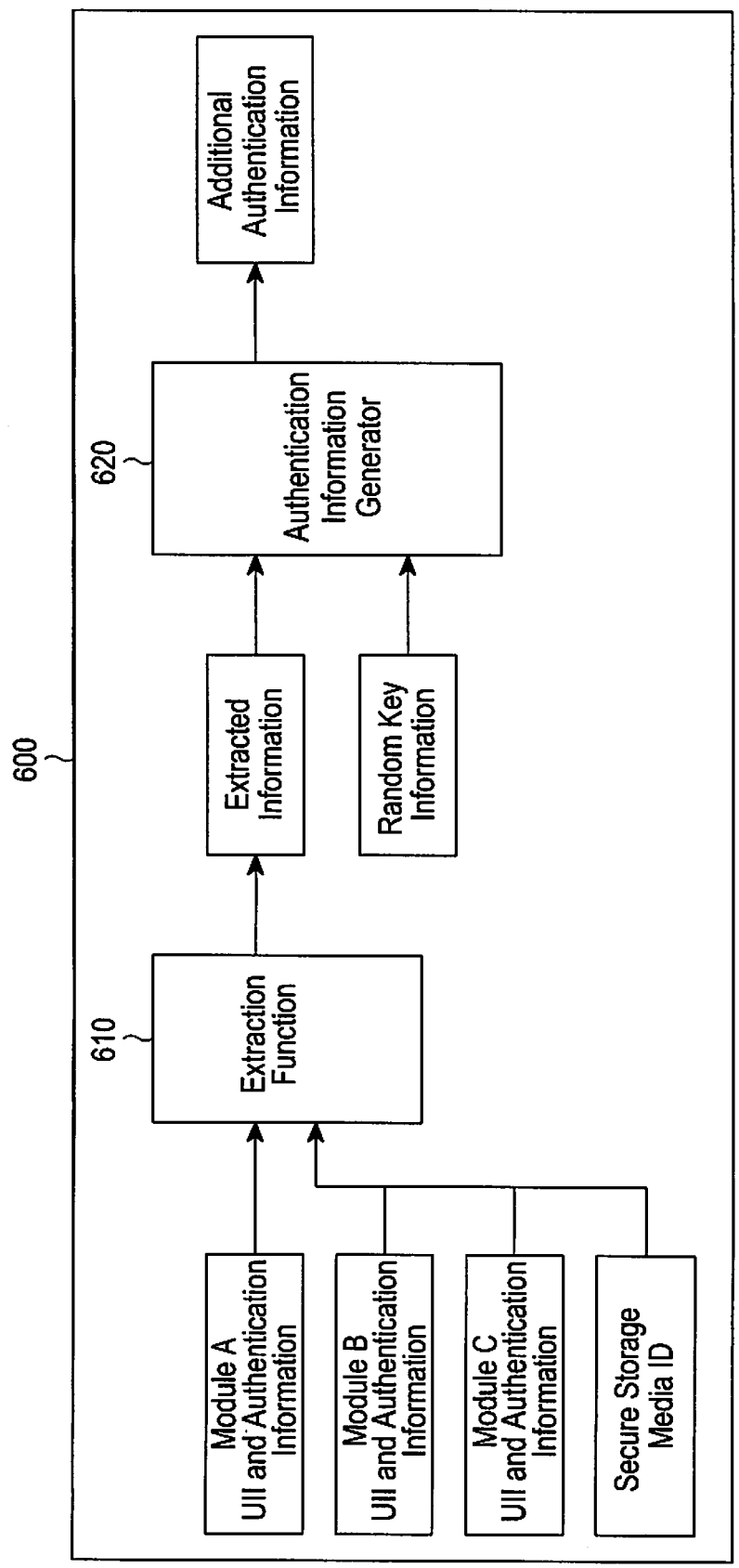
FIG. 15 is a block diagram illustrating an additional authentication information generation device, according to an embodiment of the present invention.

FIG. 15 is a block diagram illustrating an additional authentication information generation device 600, according to an embodiment of the present invention.

Referring to FIGS. 7 and 15, an extraction function 610 generates the EMID of the module B 120d based on the second UII of the module B 120d and the already-known prefixed information of the module B 120d, as shown in Equation (4) below.

$$\text{EMID=Hash (Second UII, Prefixed Information of Module B)} \quad (4)$$

The extraction function 610 outputs the extracted information calculated based on the EMID and the first UII of the module A 110d. The extracted information may be indicated as set forth below.

EX 1) Extracted Information=First UII XOR EMID
EX 2) Extracted Information=First UII∥EMID An authentication information generator 620 receives the extracted information output from the extraction function 610 and the key information, which is a random value, and generates and outputs additional authentication information associated with the extracted information and the key information.

The additional authentication information generation device 600 transmits the additional authentication information and the key information to the host 200a, which then stores the additional authentication information and the key information in the storage 100d.

Referring to FIGS. 13 and 14, the authenticator 205d and the decryption device 300d may be used to process additional authentication information in addition to content decryption.

The authenticator 205d sequentially performs authentication protocols with respect to the controller 110f and the non-volatile memory 120f, which are integrated in the storage 100f, by using a plurality of module authenticators. The authenticator 205d then generates extracted information associated with the EMID of the non-volatile memory 120f and the UII of the controller 110f by using the extraction information.

The decryption device 300d generates additional authentication information associated with the extracted information and the key information by using the content encryption key generation function. The decryption device 300d determines whether authentication with respect to the storage 100f succeeds by comparing the additional authentication information (or configuration information thereof) received from the storage 100f and the generated authentication information (or configuration information thereof).

In the foregoing embodiments, an encryption key is generated based on a preset equation and content are encrypted or decrypted by using the encryption key, but according to another embodiment of the present invention, the encryption key may have a random value.

Figure 16:
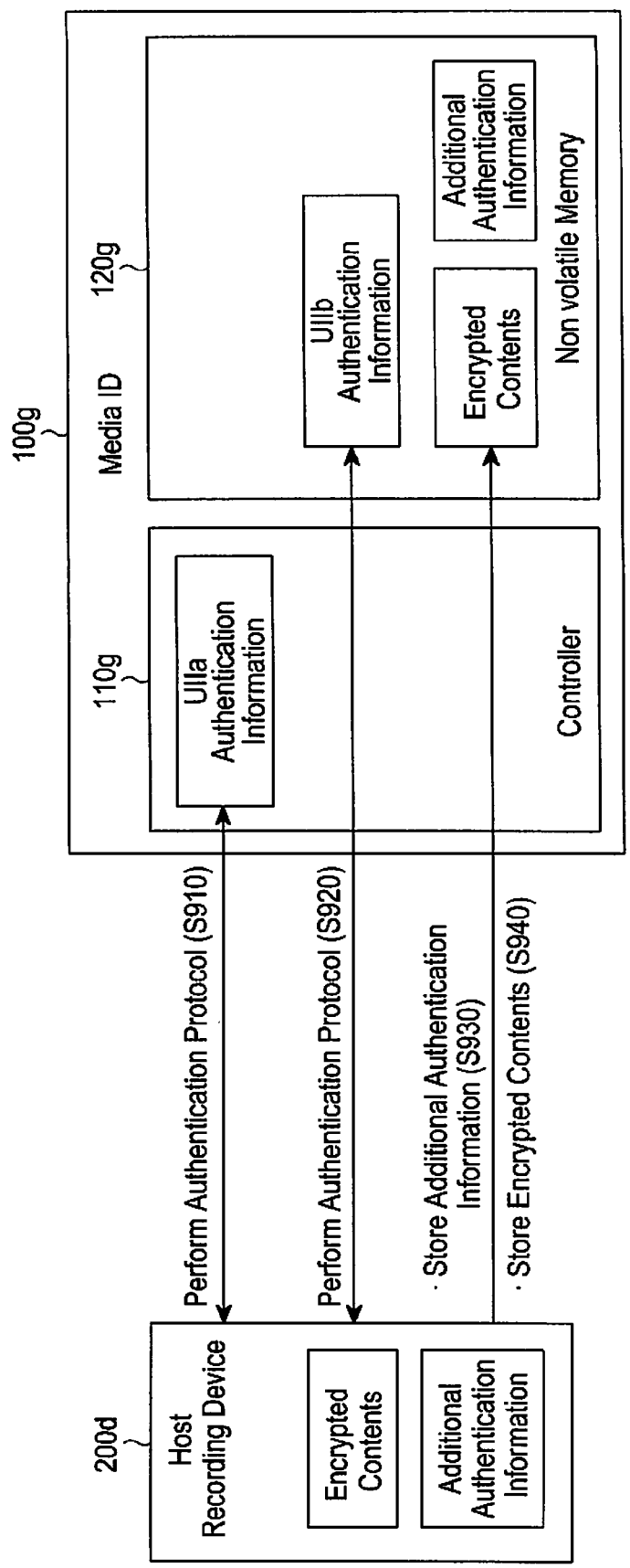
FIG. 16 is a diagram illustrating a method for storing/recording encrypted content, according to an embodiment of the present invention.

FIG. 16 is a diagram illustrating a method for storing/recording encrypted content, according to an embodiment of the present invention. FIG. 16 shows an example where the host 200d directly encrypts content. The host 200d has a structure similar to the host 200 shown in FIG. 5, and the host 200d further includes an additional authentication information generation device 700 shown in FIG. 17.

The host 200d generates an encryption key, which is a random value, and carries out content encryption. In particular, when content, which are broadcast by a content service server, are stored from the host 200d in a storage 100g, the host 200d may generate a content encryption key.

The host 200d sequentially performs authentication protocols with respect to a controller 110g and a non-volatile memory 120g (corresponding to modules A and B) integrated in the storage 100g, by using A and B module authenticators, in steps S910 and S920.

Specifically, the host 200d requests, receives, and acquires first and second authentication information, and authenticates the controller 110g and the non-volatile memory 120g based on the first and second UII (UIIa and UIIb) and the first and second authentication information by using the A and B module authenticators.

Figure 17:
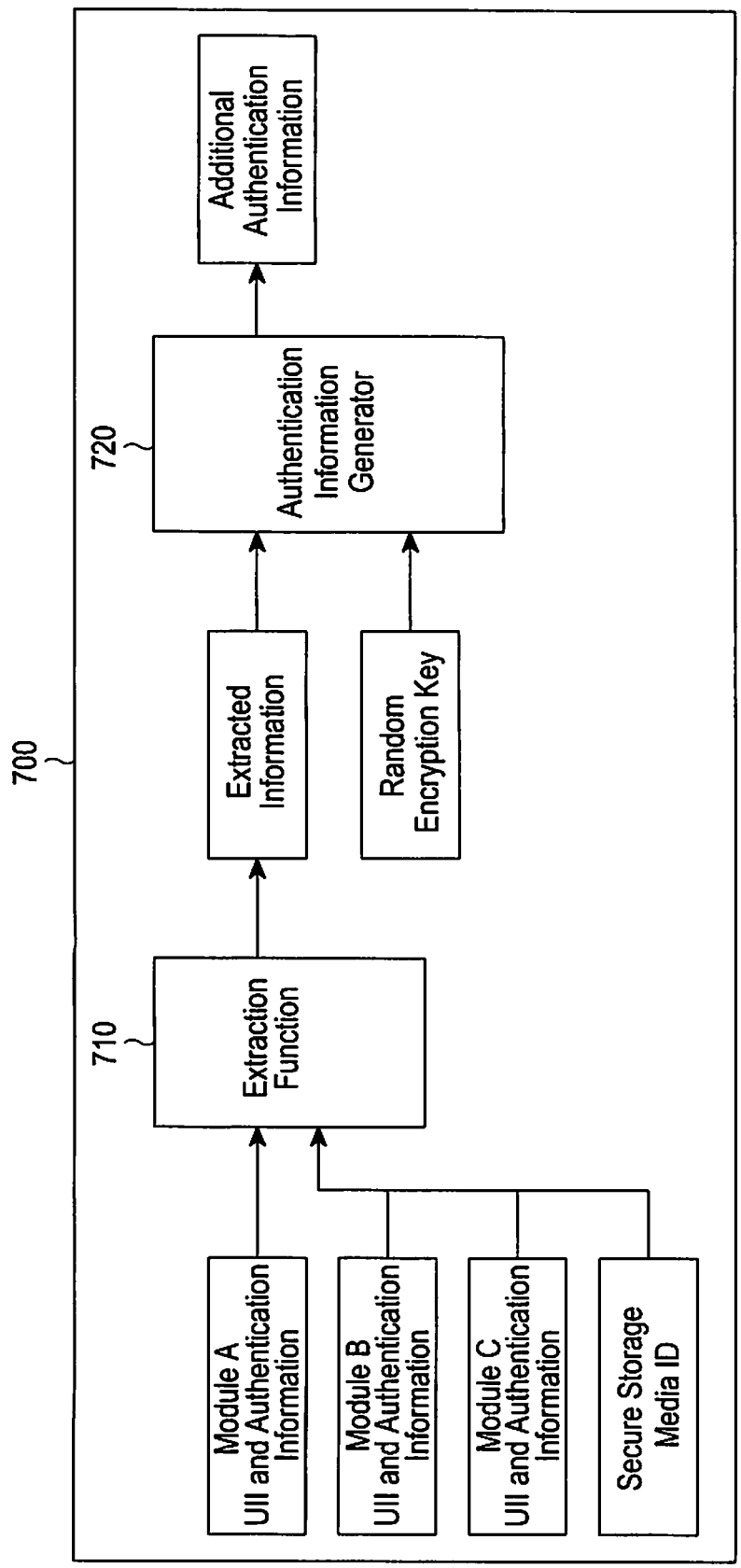
FIG. 17 is a block diagram illustrating an additional authentication information generation device, according to an embodiment of the present invention.

FIG. 17 is a block diagram illustrating an additional authentication information generation device 700, according to an embodiment of the present invention. The additional authentication information generation device 700 has a structure similar to the additional authentication information generation device 600 shown in FIG. 15, except that it receives an encryption key, which is a random value.

An extraction function 710 generates an EMID of the non-volatile memory 120g based on the second UII of the non-volatile memory 120g and the already-known prefixed information of the non-volatile memory 120g, in accordance with Equation (5) below.

$$\text{EMID} = \text{Hash (Second UII, Prefixed Information of Non-Volatile Memory)} \quad (5)$$

The extraction function 710 outputs extracted information calculated based on the EMID and the first UII of the controller 110g. The extracted information may be indicated as below.

EX 1) Extracted Information=First UII XOR EMID
EX 2) Extracted Information=First UII||EMID An authentication information generator 720 receives the extracted information output from the extraction function 710, and the encryption key, which is a random value. The authentication information generator 720 generates and outputs additional authentication information associated with the extracted information and the encryption key.

Referring back to FIG. 16, the host 200d encrypts content with the random encryption key, and stores or records the encrypted content and the additional authentication information in the non-volatile memory 120g of the storage 100g, in steps S930 and S940.

Figure 18:
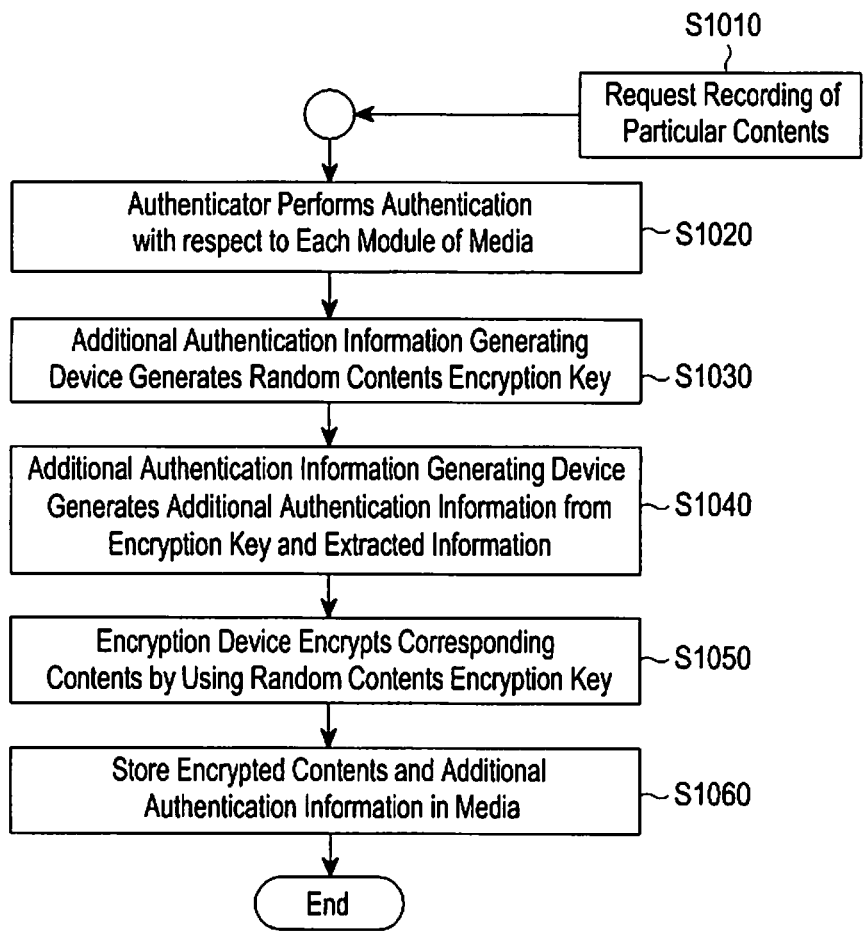
FIG. 18 is a flowchart illustrating a method for storing/recording encrypted content, according to an embodiment of the present invention.
Figure 19:
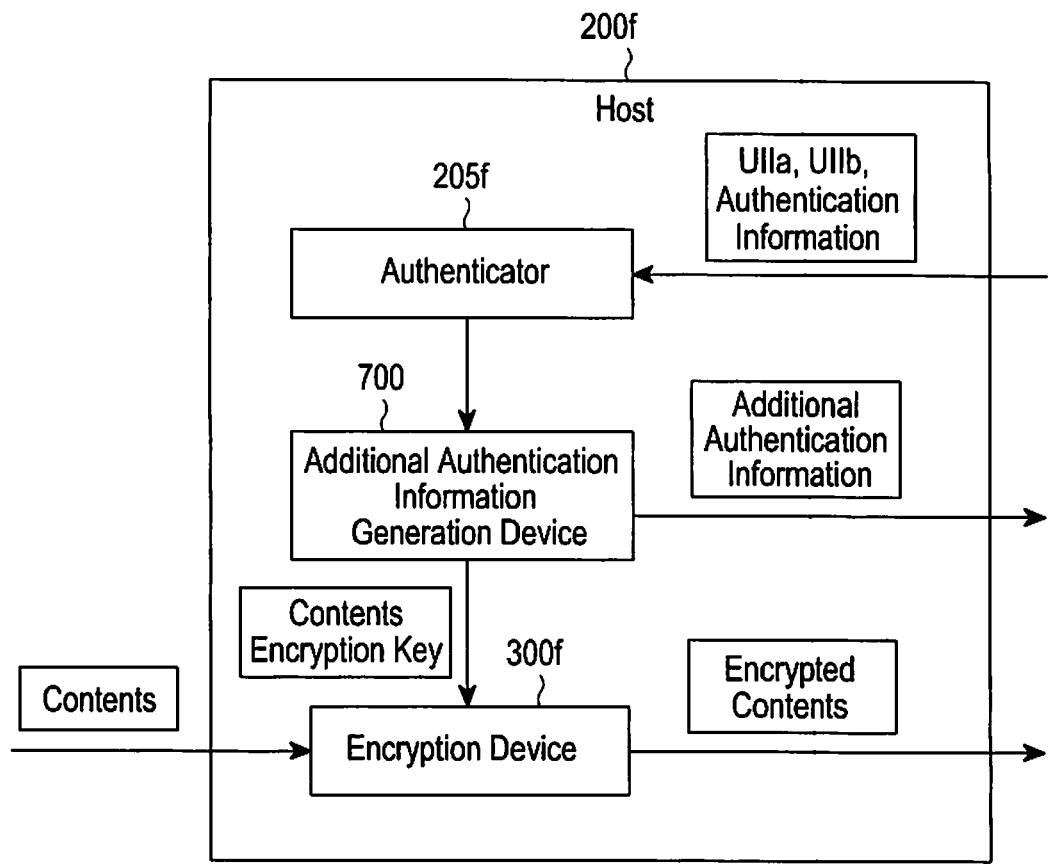
FIG. 19 is a diagram illustrating a main structure of a host related to FIG. 18, according to an embodiment of the present invention.

FIG. 18 is a flowchart illustrating a method for storing/recording encrypted content, according to an embodiment of the present invention. FIG. 19 is a diagram illustrating a main structure of a host related to FIG. 18, according to an embodiment of the present invention. Storage may be performed in the storage 100g shown in FIG. 16.

A host 200f receives a storing/recording request with respect to particular content, in step S1010. For example, this storing/recording request receiving step may correspond to a step of receiving a content recording or storing command issued by a user through an input device included in the host 200f.

An authenticator 205f included in the host 200f has a structure similar to the authenticator 205 shown in FIG. 5. The authenticator 205f requests, receives, and acquires UII (UIIa and UIIb) and authentication information regarding the plurality of modules 110g and 120g integrated in the storage 100g, by using a plurality of module authenticators. The authenticator 205f authenticates the storage 100g based on the first and second UII and the first and second authentication information regarding the controller 110g and the non-volatile memory 120g, in step S1020.

The additional authentication information generation device 700 generates a random content encryption key, in step S1030. The additional authentication information generation device generates and outputs additional authentication information associated with the extracted information based on the EMID and the random content encryption key, in step S1040.

An encryption device 300f encrypts content with the random encryption key in step S1050.

The encryption device 300f stores the encrypted content and the additional authentication information in the storage 100g, in step S1060.

Figure 20:
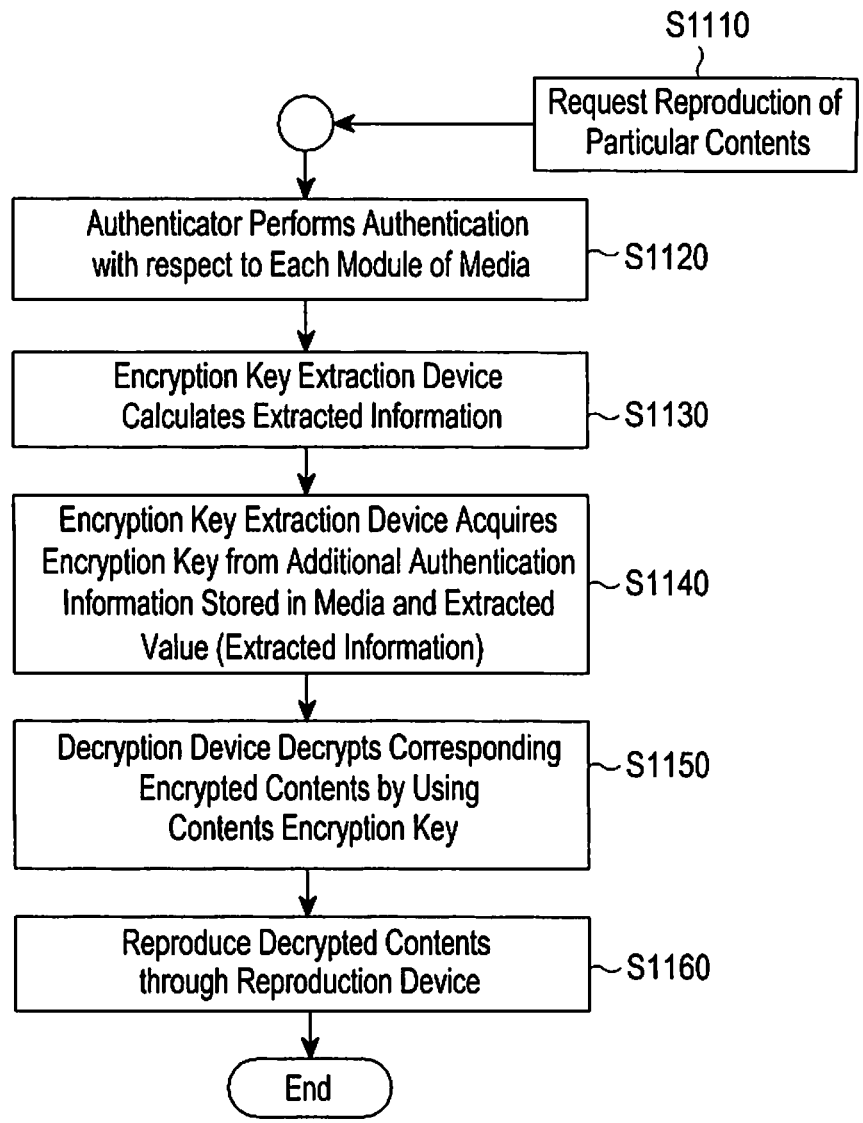
FIG. 20 is a flowchart of a method for reproducing encrypted content, according to an embodiment of the present invention.
Figure 21:
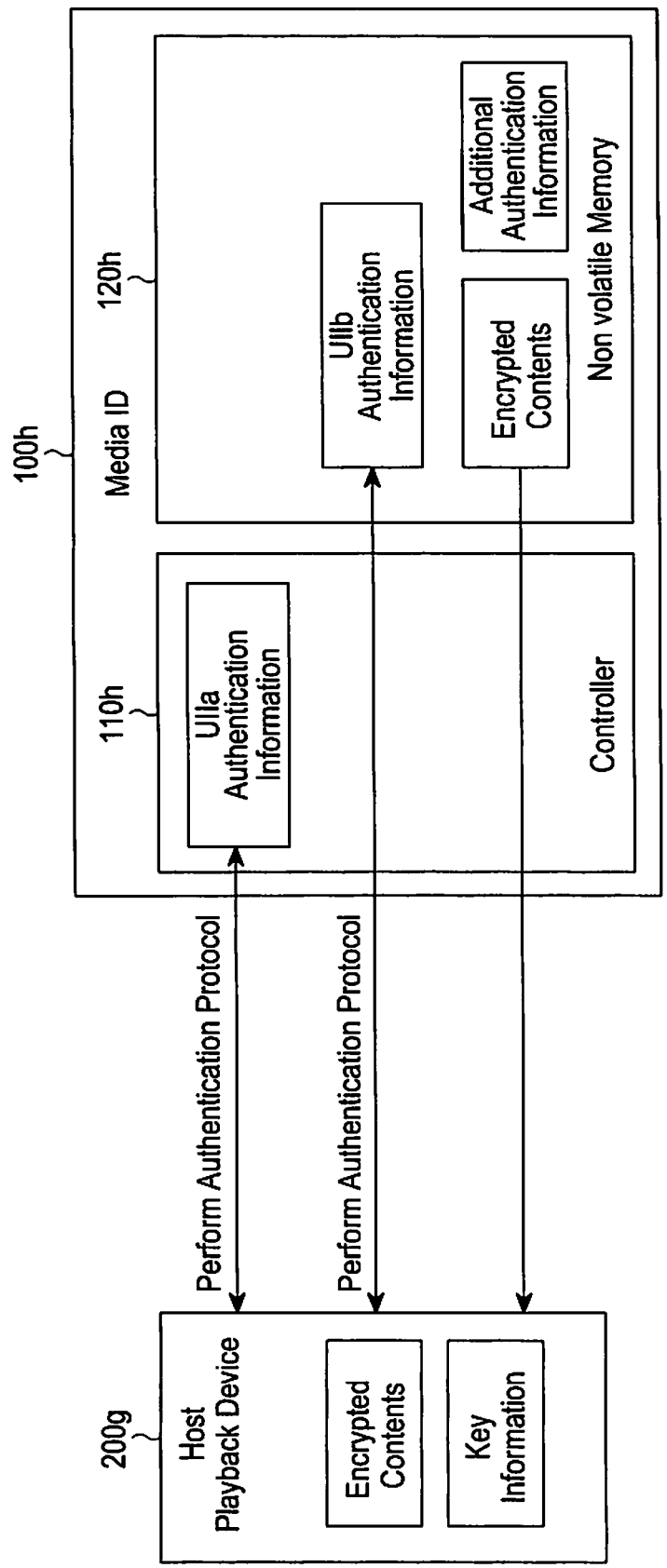
FIG. 21 is a diagram illustrating a reproducing method of FIG. 20, according to an embodiment of the present invention.
Figure 22:
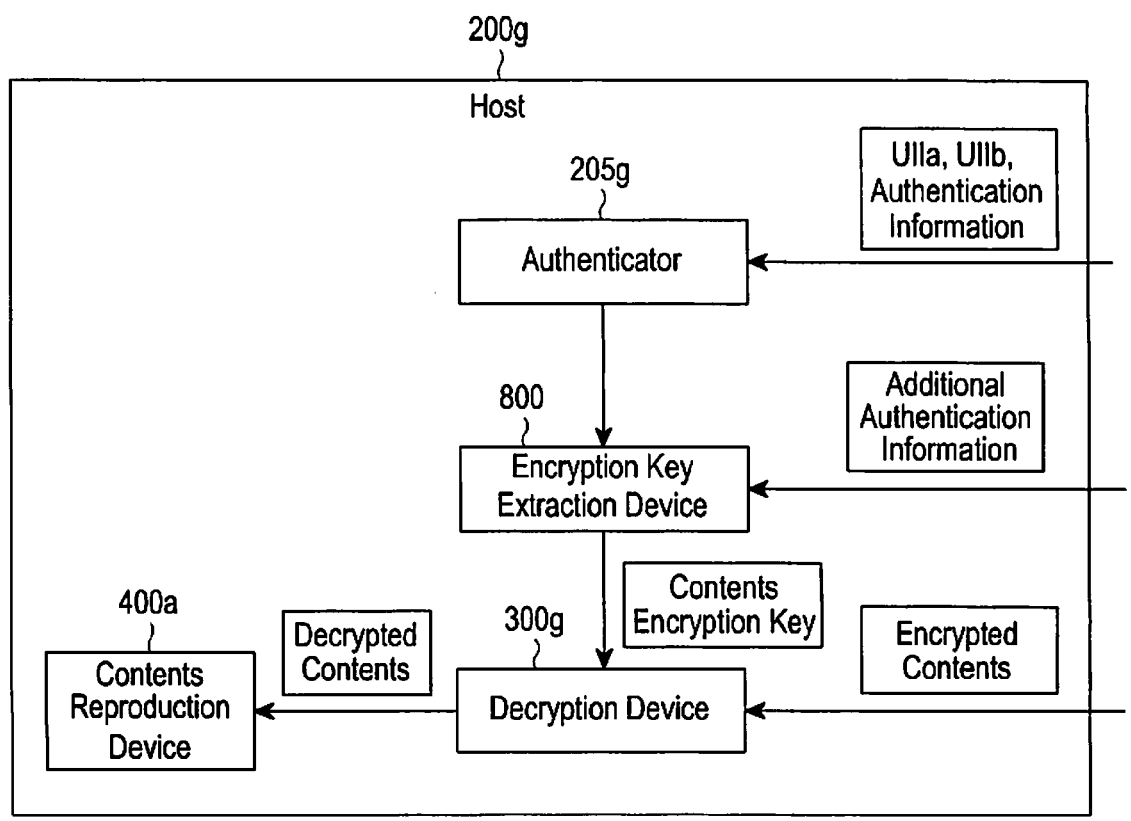
FIG. 22 is a block diagram illustrating a main structure of a host related to a reproducing method of FIG. 20, according to an embodiment of the present invention.
Figure 23:
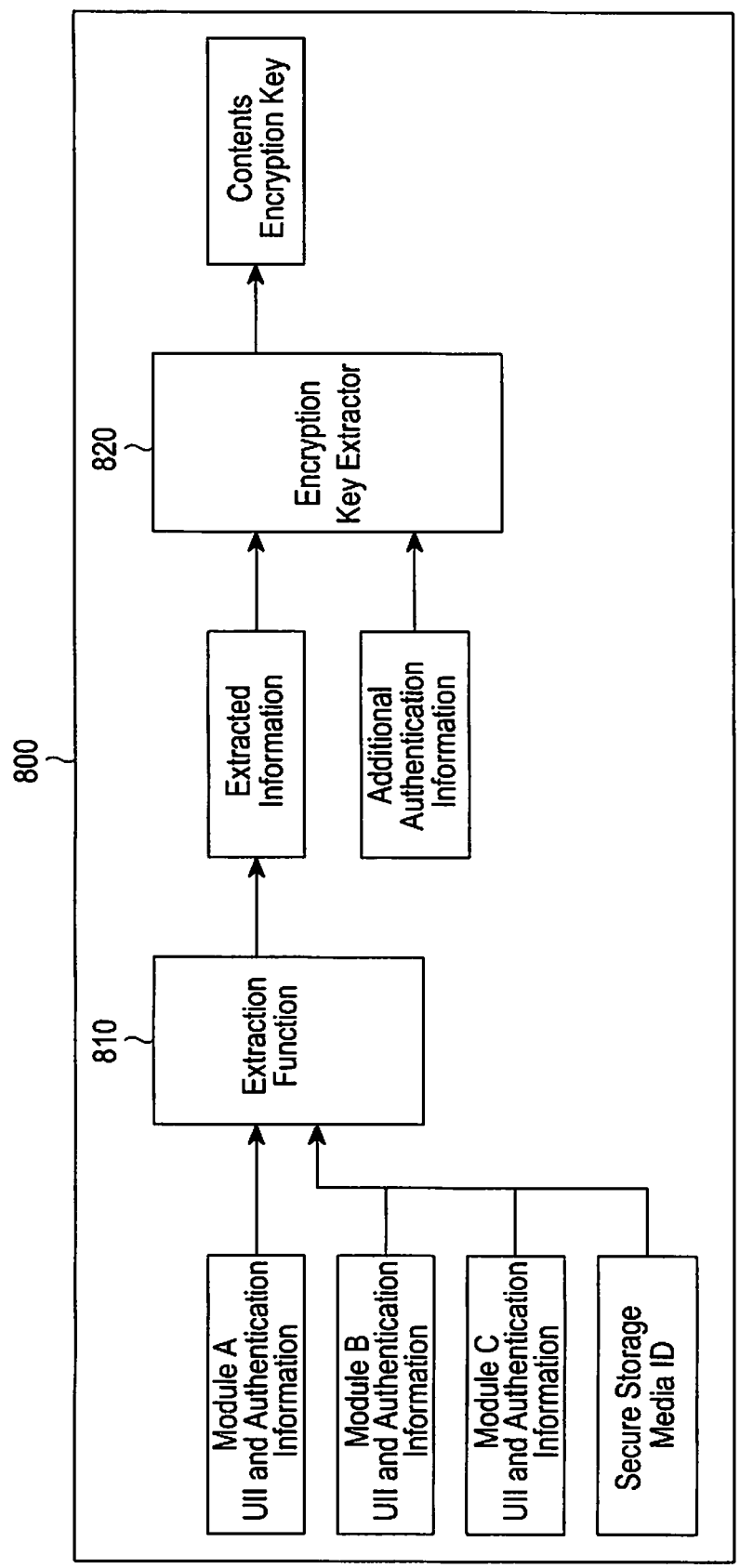
FIG. 23 is a block diagram illustrating an encryption key extraction device, according to an embodiment of the present invention.

FIG. 20 is a flowchart illustrating a method for reproducing encrypted content, according to an embodiment of the present invention. FIG. 21 is a diagram illustrating the reproducing method of FIG. 20, according to an embodiment of the present invention. FIG. 22 is a block diagram illustrating a main structure of a host related to the reproducing method of FIG. 20, according to an embodiment of the present invention. FIG. 23 is a block diagram illustrating an encryption key extraction device, according to an embodiment of the present invention.

A host 200g receives a reproducing request with respect to particular content, in step S1110. For example, this reproducing request receiving step may correspond to a step of receiving a content reproducing command issued by the user through an input device included in the host 200g.

An authenticator 205g included in the host 200g has a structure similar to the authenticator 205 shown in FIG. 5, except that it further includes an encryption key extraction device 800, as shown in FIG. 23.

The authenticator 205g sequentially performs authentication protocols with respect to a controller 110h and a non-volatile memory 120h integrated in a storage 100h, by using a plurality of module authenticators, in step S1120. Specifically, the host 200g requests, receives, and acquires first and second UII (UIIa and UIIb) and first and second authentication information. The authenticator 205g authenticates the storage 100h based on the first and second UII and the first and second authentication information regarding the controller 110h and the non-volatile memory 120h.

Referring to FIG. 23, an extraction function 810 of the encryption key extraction device 800 generates an EMID of the non-volatile memory 120h based on the second UII of the non-volatile memory 120h and already-known prefixed information of the non-volatile memory 120h, as set forth in Equation (6) below.

$$\text{EMID} = \text{Hash (Second UII, Prefixed Information of Non-Volatile Memory)} \quad (6)$$

The extraction function 810 outputs extracted information calculated based on the EMID and the first UII of the controller 110h, in step S1130. The extracted information may be indicated as below.

EX 1) Extracted Information=First UII XOR EMID
EX 2) Extracted Information=First UII||EMID An encryption key extractor 820 receives the extracted information output from the extraction function 810 and additional authentication information, and extracts and outputs a content encryption key, which is a random value, from them, in step S1140.

Referring back to FIG. 22, a decryption device 300g receives the key information and generates a content encryption key associated with the extracted information and the key information by using a content encryption key generation function.

The decryption device 300g decrypts the encrypted content by using the content encryption key, in step S1150.

The decryption device 300g forwards the decrypted content to a content reproduction device 400a.

The content reproduction device 400a then reproduces the content, in step S1160.

According to embodiments of the present invention, when various modules (a device-memory, a controller, etc.) having different functions are used in a storage (a Secure Digital (SD) card, a Hard Disk Drive (HDD), a Universal Serial Bus (USB), or the like), UII and authentication information are issued to the respective modules. A host performs independent authentication with respect to each module to finally determine an authentication result, thereby securely authenticating the storage. In particular, by integrating several UII and using the integrated UII, it is possible to prevent an attack, which may occur due to an improper function of any one of the modules.

The embodiments of the present invention can be implemented with hardware, software, or a combination of hardware and software. Such arbitrary software may be stored, whether or not erasable or re-recordable, in a volatile or non-volatile storage such as a Read-Only Memory (ROM); a memory such as a Random Access Memory (RAM), a memory chip, a device, or an integrated circuit; and an optically or magnetically recordable and machine (e.g., computer)-readable storage medium such as a Compact Disc (CD), a Digital Versatile Disk (DVD), a magnetic disk, or a magnetic tape. A memory that can be included in a host may be an example of a machine-readable storage medium, which is suitable for storing a program or programs including instructions for implementing the embodiments of the present invention. Therefore, embodiments of the present invention include a program including codes for implementing a device or method claimed in an arbitrary claim and a machine-readable storage medium for storing such a program. The program may be electronically transferred through an arbitrary medium such as a communication signal delivered through wired or wireless connection, and the present invention properly includes equivalents thereof.

The host device may receive and store the program from a program providing device connected in a wired or wireless manner. The program providing device may include a memory for storing a program including instructions for instructing the host to execute a preset content protection method, information necessary for the content protection method, and so forth, a communication unit for performing wired or wireless communication with the host, and a controller for transmitting a corresponding program to the host at the request of the host device or automatically.

While the invention has been shown and described with reference certain embodiments thereof, it will be understood by those skilled in the art that various changes in form and detail maybe made therein without departing from the spirit and scope of the invention as defined by the appended claims and equivalents thereof.

What is claimed is:

1. A method for protecting content of a storage device, the method comprising the steps of:
    authenticating, by a host device, a controller of the storage device based on first unique information of the controller of the storage device, wherein the first unique information is unique to the controller of the storage device;
    authenticating, by the host device, a memory of the storage device based on second unique information of the memory of the storage device, wherein the second unique information is unique to the memory of the storage device; and
    permitting, by the host device, access to encrypted content stored in the storage device if the controller and the memory are authenticated,
    wherein the host device is configured to receive the encrypted content and authentication information from the storage device, and
    wherein the authentication information is calculated based on an Enhanced Media Identifier (EMID) and the first unique information, and the EMID is calculated based on the second unique information and prefixed information indicating a value allocated to an application.

2. The method of claim 1, further comprising:
    decrypting the encrypted content by using a content encryption key which was used to encrypt the encrypted content.

3. The method of claim 2, further comprising reproducing the decrypted content.

4. The method of claim 1, wherein access to the encrypted content comprises at least one of reproduction, movement, copying, reading, storage, and removal of the content.

5. The method of claim 2, wherein the content encryption key is a random value.

6. The method of claim 1,
    wherein the access to the encrypted content stored in the storage device is permitted if the controller and the memory are authenticated and the authentication information is valid.

7. The method of claim 1, further comprising:
    generating a content encryption key which is a random value;
    encrypting the content by using the content encryption key; and
    storing the encrypted content and the authentication information in the storage device.

8. A non-transitory machine-readable storage medium having recorded thereon a program for executing a method for protecting content of a storage device, the method comprising the steps of:
    obtaining, from the storage device by a host device, first information of a controller of the storage device, wherein the first information is specified for the controller of the storage device;
    obtaining, from the storage device by the host device, second information of a memory of the storage device, wherein the second information is specified for the memory of the storage device;
    receiving, by the host device, authentication information from the storage device, wherein the authentication information is calculated based on an Enhanced Media Identifier (EMID) and the first information, and the EMID is calculated based on the second information and a value allocated to an application; and
    permitting, by the host device, access to encrypted content stored in the storage device if the storage device is authenticated based on the authentication information,
    wherein the host device is configured to receive the encrypted content from the storage device.

9. A host device for protecting content of a storage device, the host device comprising:
    a non-transitory memory; and
    an authentication unit configured to:
    authenticate a controller of the storage device based on first unique information of the controller of the storage device, wherein the first unique information is unique to the controller of the storage device;
    authenticate a memory of the storage device based on second unique information of the memory of the storage device, wherein the second unique information is unique to the memory of the storage device; and
    permit access to encrypted content stored in the storage device if the controller and the memory are authenticated,
    wherein the host device is configured to receive the encrypted content and authentication information from the storage device, and
    wherein the authentication information is calculated based on an Enhanced Media Identifier (EMID) and the first unique information, and the EMID is calculated based on the second unique information and prefixed information indicating a value allocated to an application.

10. The host device of claim 9, further comprising a decryption device decrypting the encrypted content received from the storage device by using a content encryption key which was used to encrypt the encrypted content.

11. A storage device for protecting content, the storage device comprising:
- a controller configured to include first unique information and provide the first unique information to a host device, wherein the first unique information is unique to the controller of the storage device; and
- a memory configured to include second unique information, provide the second unique information to the host device and store encrypted content, wherein the second unique information is unique to the memory of the storage device,
- wherein the storage device is configured to provide the encrypted content and authentication information to the host device, and
- wherein the authentication information is calculated based on an Enhanced Media Identifier (EMID) and the first unique information, and the EMID is calculated based on the second unique information and prefixed information indicating a value allocated to an application.

12. The storage device of claim 11, wherein a content encryption key which was used to encrypt the encrypted content is a random value.

13. The host device of claim 9, wherein the host device is configured for:
- reading the first unique information from the storage device; and
- reading the second unique information from the storage device,
- wherein the second unique information is an encoded value.

14. The host device of claim 9, wherein the authentication information is calculated based on the EMID, the first unique information and a content encryption key which was used to encrypt the encrypted content, and the content encryption key is a random value.

15. The method of claim 1, wherein the second information is obtained in encrypted form.

* * * * *